US012422127B2

(12) United States Patent
Kato et al.

(10) Patent No.: US 12,422,127 B2
(45) Date of Patent: Sep. 23, 2025

(54) LIGHTING MODULE AND LIGHTING DEVICE

(71) Applicant: Nichia Corporation, Anan (JP)

(72) Inventors: Masaru Kato, Sagamihara (JP); Hiroshi Miyairi, Yokohama (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 18/727,506

(22) PCT Filed: Nov. 15, 2022

(86) PCT No.: PCT/JP2022/042419
§ 371 (c)(1),
(2) Date: Jul. 9, 2024

(87) PCT Pub. No.: WO2023/145200
PCT Pub. Date: Aug. 3, 2023

(65) Prior Publication Data
US 2025/0075885 A1    Mar. 6, 2025

(30) Foreign Application Priority Data
Jan. 27, 2022    (JP) .................. 2022-011225

(51) Int. Cl.
*F21V 17/00*    (2006.01)
*F21S 2/00*    (2016.01)
(Continued)

(52) U.S. Cl.
CPC ............ *F21V 17/005* (2013.01); *F21S 2/005* (2013.01); *F21V 5/04* (2013.01); *F21V 17/10* (2013.01);
(Continued)

(58) Field of Classification Search
CPC ........ F21V 17/00; F21V 17/005; F21V 17/10; F21V 17/104; F21V 5/043; F21S 43/26231; F21S 41/27
See application file for complete search history.

(56) References Cited

U.S. PATENT DOCUMENTS 5,708,519 A    1/1998  Yamamoto et al.
6,352,359 B1   3/2002  Shie et al.
(Continued)

FOREIGN PATENT DOCUMENTS

CN    111853560 A  * 10/2020  ............... F21K 9/20
CN    113091013 A  *  7/2021  ............. F21S 41/16
(Continued)

OTHER PUBLICATIONS

International Search Report (ISR) and Written Opinion mailed Jan. 17, 2023 in International Application No. PCT/JP2022/042419, with Translation of the ISR, 10 pages.

*Primary Examiner* — Alexander K Garlen
(74) *Attorney, Agent, or Firm* — Kim & Stewart LLP

(57) ABSTRACT

A lighting module includes: a substrate; a light source located on the substrate; a first lens on which light emitted from the light source is to be incident; and a first holder to which the substrate and the first lens are fixed. Light exiting the first lens is substantially parallel light that is substantially parallel to the optical axis when viewed from a first direction intersecting an optical axis of the light source. The light exiting the first lens is substantially parallel light oblique to the optical axis when viewed from a second direction intersecting the optical axis and the first direction. A first end part of the first lens in the second direction is fixed to the first holder. When viewed from a third direction in which the optical axis extends, the first holder does not protrude outward of the first lens in the second direction.

12 Claims, 15 Drawing Sheets

(51) Int. Cl.
*F21V 5/04* (2006.01)
*F21V 17/10* (2006.01)
*F21Y 115/10* (2016.01)
*F21Y 113/00* (2016.01)

(52) U.S. Cl.
CPC ........ *F21Y 2113/00* (2013.01); *F21Y 2115/10* (2016.08)

(56) References Cited

U.S. PATENT DOCUMENTS

| | | | |
|---|---|---|---|
| 2011/0080744 A1* | 4/2011 | Woodward | F21V 17/10 362/317 |
| 2012/0155091 A1 | 6/2012 | Takatori | |
| 2014/0169014 A1* | 6/2014 | Jungwirth | F21S 41/24 362/509 |
| 2016/0201876 A1 | 7/2016 | Lv et al. | |
| 2017/0269278 A1 | 9/2017 | Fukuma et al. | |
| 2018/0058660 A1 | 3/2018 | Fujimori et al. | |
| 2019/0204528 A1* | 7/2019 | Oshima | B60Q 1/04 |
| 2022/0074564 A1* | 3/2022 | Li | F21S 41/255 |
| 2022/0146074 A1* | 5/2022 | Kiba | G02B 7/02 |
| 2022/0412528 A1* | 12/2022 | Li | F21S 41/192 |
| 2024/0295301 A1* | 9/2024 | Gong | F21V 17/16 |

FOREIGN PATENT DOCUMENTS

| | | | | |
|---|---|---|---|---|
| EP | 2366534 A2 | 9/2011 | | |
| JP | H06-305360 A | 11/1994 | | |
| JP | 2002-523861 A | 7/2002 | | |
| JP | 2006-048165 A | 2/2006 | | |
| JP | 2009-023247 A | 2/2009 | | |
| JP | 2011-088409 A | 5/2011 | | |
| JP | 2011-194751 A | 10/2011 | | |
| JP | 2012-133920 A | 7/2012 | | |
| JP | 2014-522083 A | 8/2014 | | |
| JP | 2015076364 A | * 4/2015 | ............ F21S 41/143 |
| JP | 2017-168253 A | 9/2017 | | |
| JP | 2018-106842 A | 7/2018 | | |
| JP | 2019-074742 A | 5/2019 | | |
| JP | 2019-194947 A | 11/2019 | | |

* cited by examiner

LIGHTING MODULE AND LIGHTING DEVICE

TECHNICAL FIELD

The invention relates to a lighting module and a lighting device.

BACKGROUND ART

Patent Literature 1 below discusses a device including multiple LED elements and multiple lenses on which light emitted from the multiple LED elements is individually incident.

CITATION LIST

Patent Literature

[Patent Literature 1] JP-A 2006-48165 (Kokai)

SUMMARY OF INVENTION

Problem to be Solved by the Invention

One object of one embodiment of the invention is to provide a lighting module and a lighting device that are very convenient.

Means for Solving the Problem

A lighting module according to an embodiment of the invention includes: a substrate; a light source located on the substrate; a first lens on which light emitted from the light source is to be incident; and a first holder to which the substrate and the first lens are fixed. Light exiting the first lens is substantially parallel light that is substantially parallel to the optical axis when viewed from a first direction intersecting an optical axis of the light source. The light exiting the first lens is substantially parallel light oblique to the optical axis when viewed from a second direction intersecting the optical axis and the first direction. A first end part of the first lens in the second direction is fixed to the first holder. When viewed from a third direction in which the optical axis extends, the first holder does not protrude outward of the first lens in the second direction.

A lighting device according to an embodiment of the invention includes a plurality of the lighting modules described above, and a fixing member configured to fix the plurality of lighting modules. The fixing member is arranged to face the plurality of lighting modules in the first direction in a state in which the plurality of lighting modules is arranged in the second direction.

Effects of the Invention

According to an embodiment of the invention, a lighting module and a lighting device that are very convenient can be provided.

DESCRIPTION OF EMBODIMENTS

Figure 1:
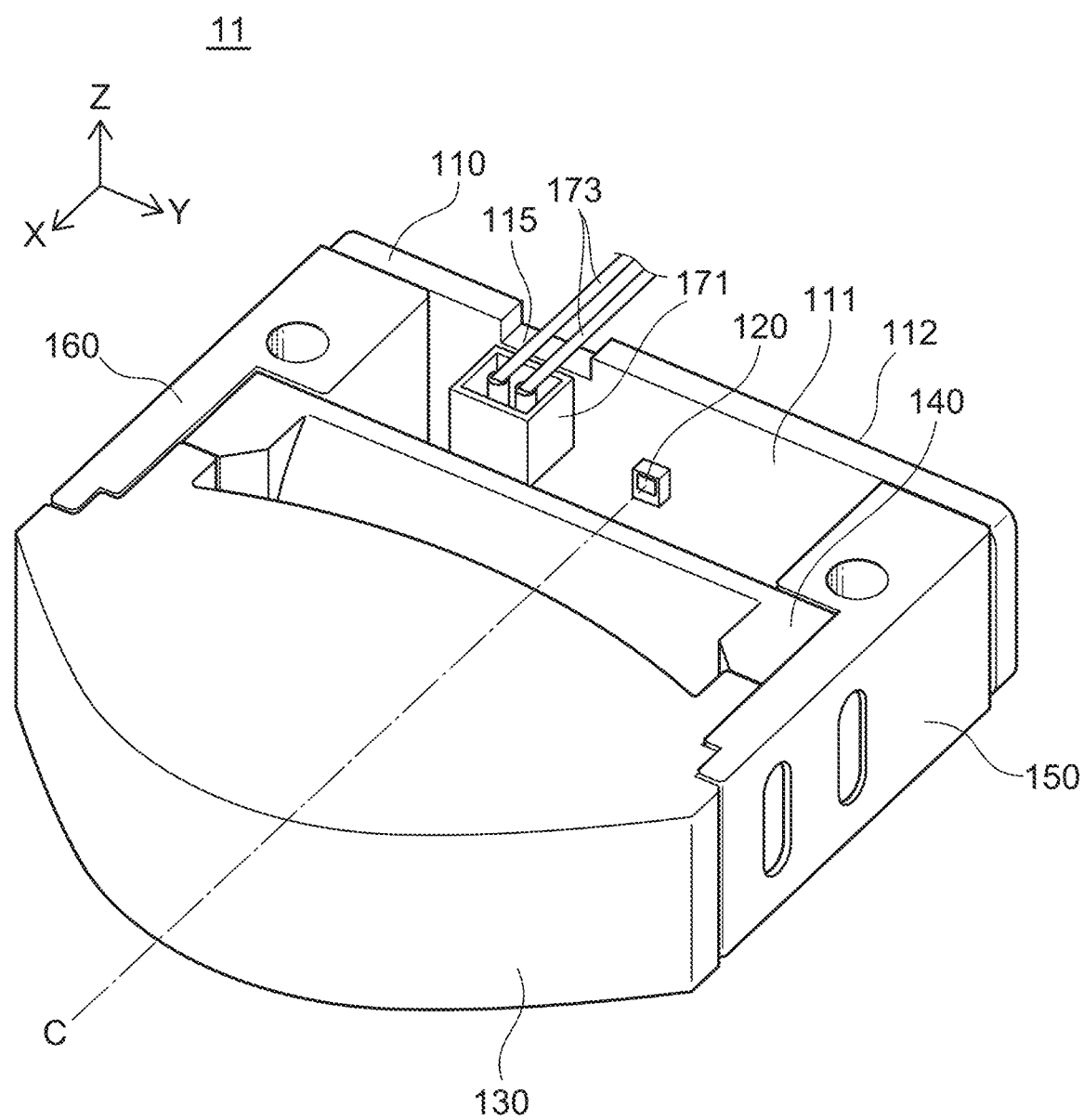
FIG. 1 is a perspective view showing a lighting module according to a first embodiment.

Embodiments will now be described with reference to the drawings. The drawings are schematic or conceptual; and the relationships between the thickness and width of portions, the proportions of sizes among portions, etc., are not necessarily the same as the actual values. Also, the dimensions and proportions may be illustrated differently among drawings, even when the same portion is illustrated. Furthermore, in the specification and the drawings, components similar to those described in regard to an antecedent drawing are marked with the same reference numerals; and a detailed description is omitted as appropriate. Also, end surfaces may be shown as cross sections.

Also, for easier understanding of the following description, the arrangements and configurations of the portions are described using an XYZ orthogonal coordinate system. An X-axis, a Y-axis, and a Z-axis are orthogonal to each other. In each drawing, the direction of the arrow among the directions in which the X-axis extends is called a "+X direction"; and the opposite direction is called a "−X direction". Also, the direction of the arrow among the directions in which the Y-axis extends is called a "+Y direction"; and the opposite direction is called a "−Y direction". Also, the direction of the arrow among the directions in which the Z-axis extends is called a "+Z direction"; and the opposite direction is called a "−Z direction". Also, the +Z direction is taken as an upward direction; and the −Z direction is taken as a downward direction; however, these directions are independent of the direction of gravity. Also, it is called "when viewed in a top-view" when viewed from the +Z direction, "when viewed in front-view" when viewed from the +X direction, and "when viewed in side-view" when viewed from the +Y direction.

First Embodiment

First, a first embodiment will be described.

FIG. 1 is a perspective view showing a lighting module according to the present embodiment.

Figure 2:
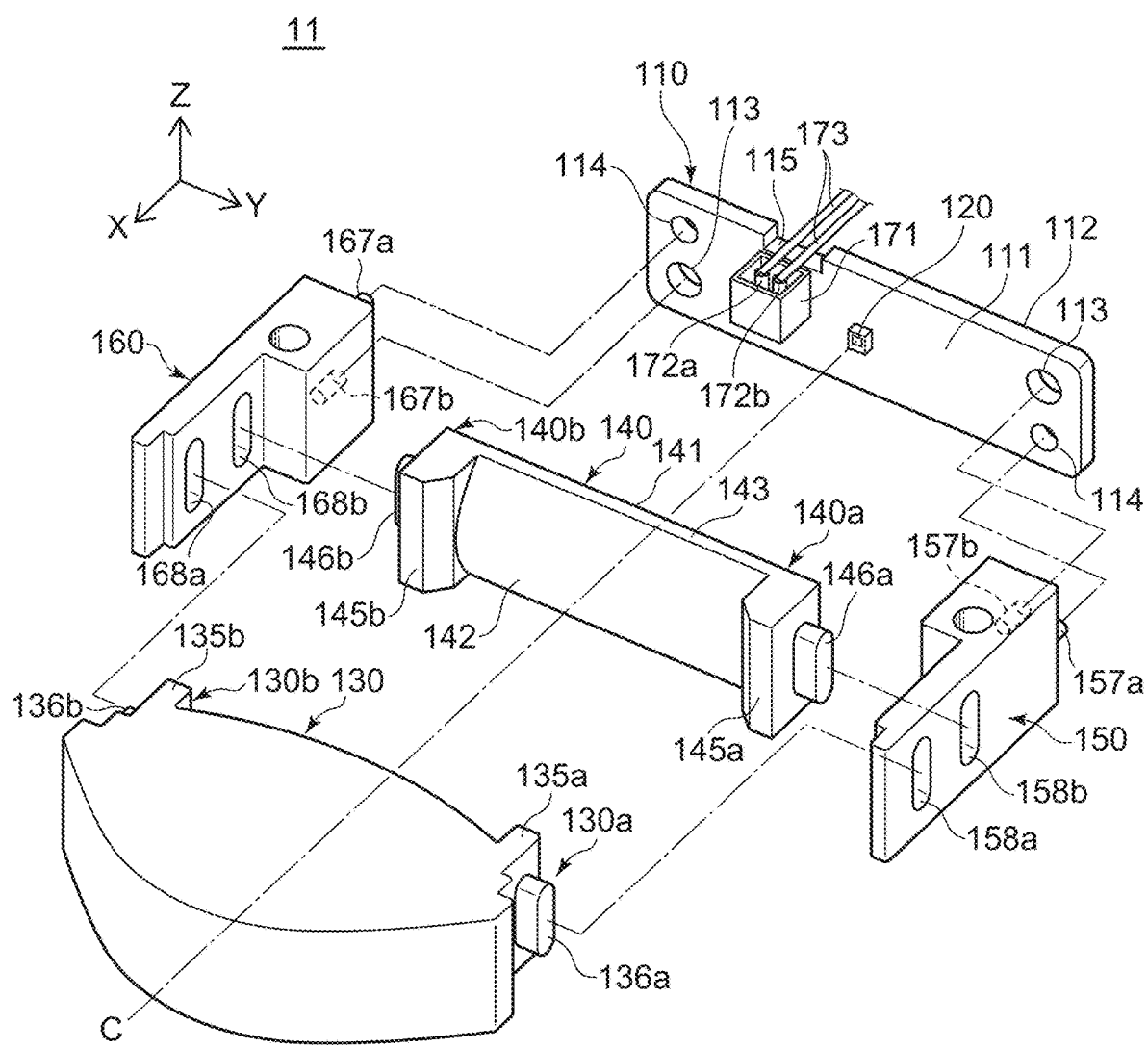
FIG. 2 is an exploded perspective view showing the lighting module according to the first embodiment.

FIG. 2 is an exploded perspective view showing the lighting module according to the present embodiment.

Figure 3:
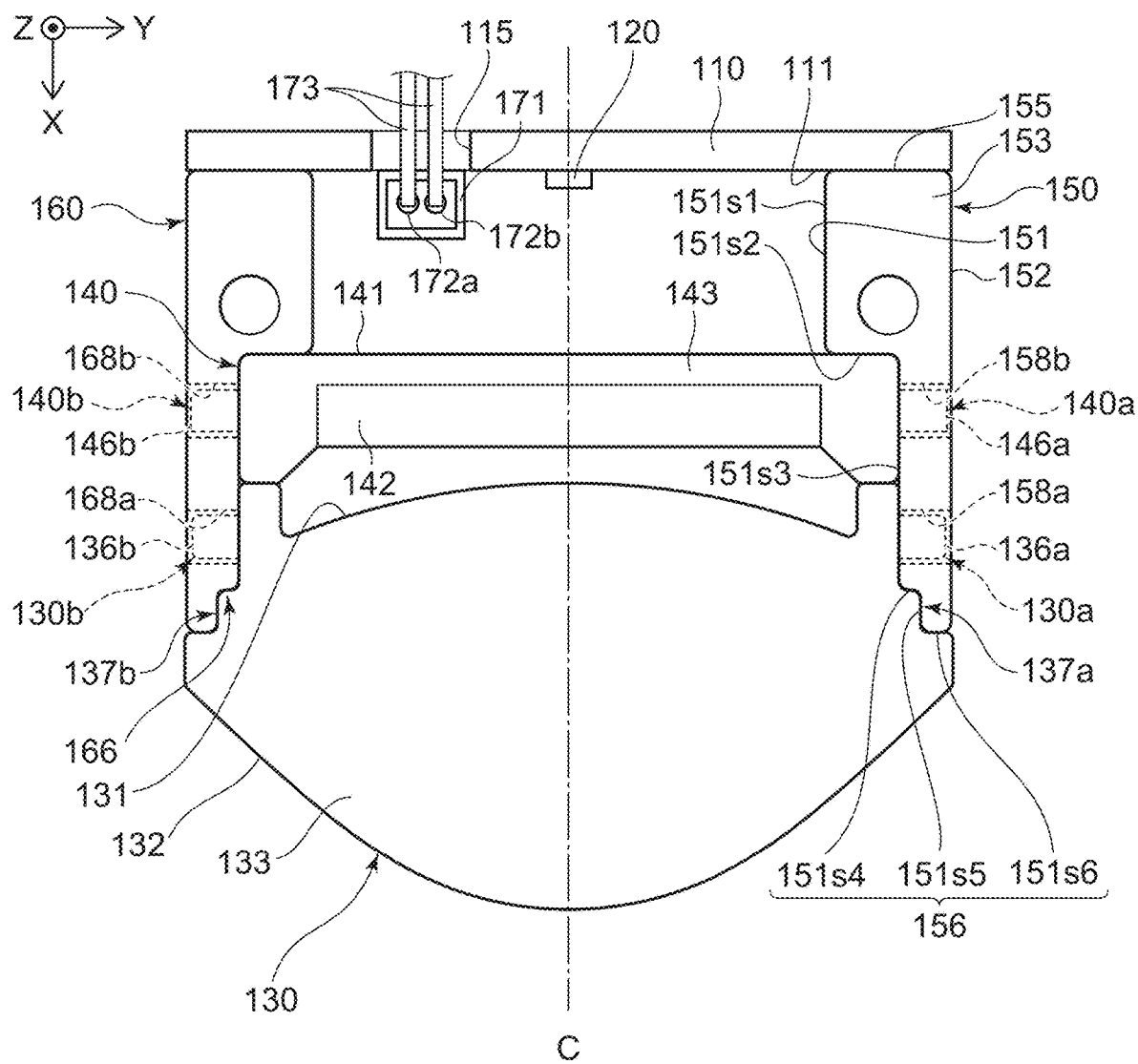
FIG. 3 is a top view showing the lighting module according to the first embodiment.

FIG. 3 is a top view showing the lighting module according to the present embodiment.

Figure 4:
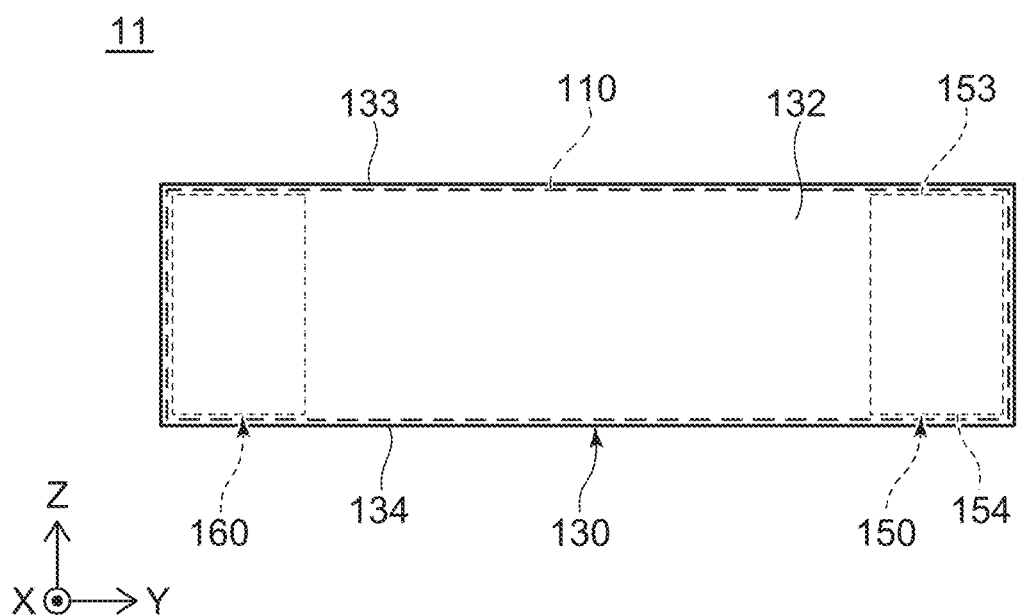
FIG. 4 is a front view showing the lighting module according to the first embodiment.

FIG. 4 is a front view showing the lighting module according to the present embodiment.

Figure 5:
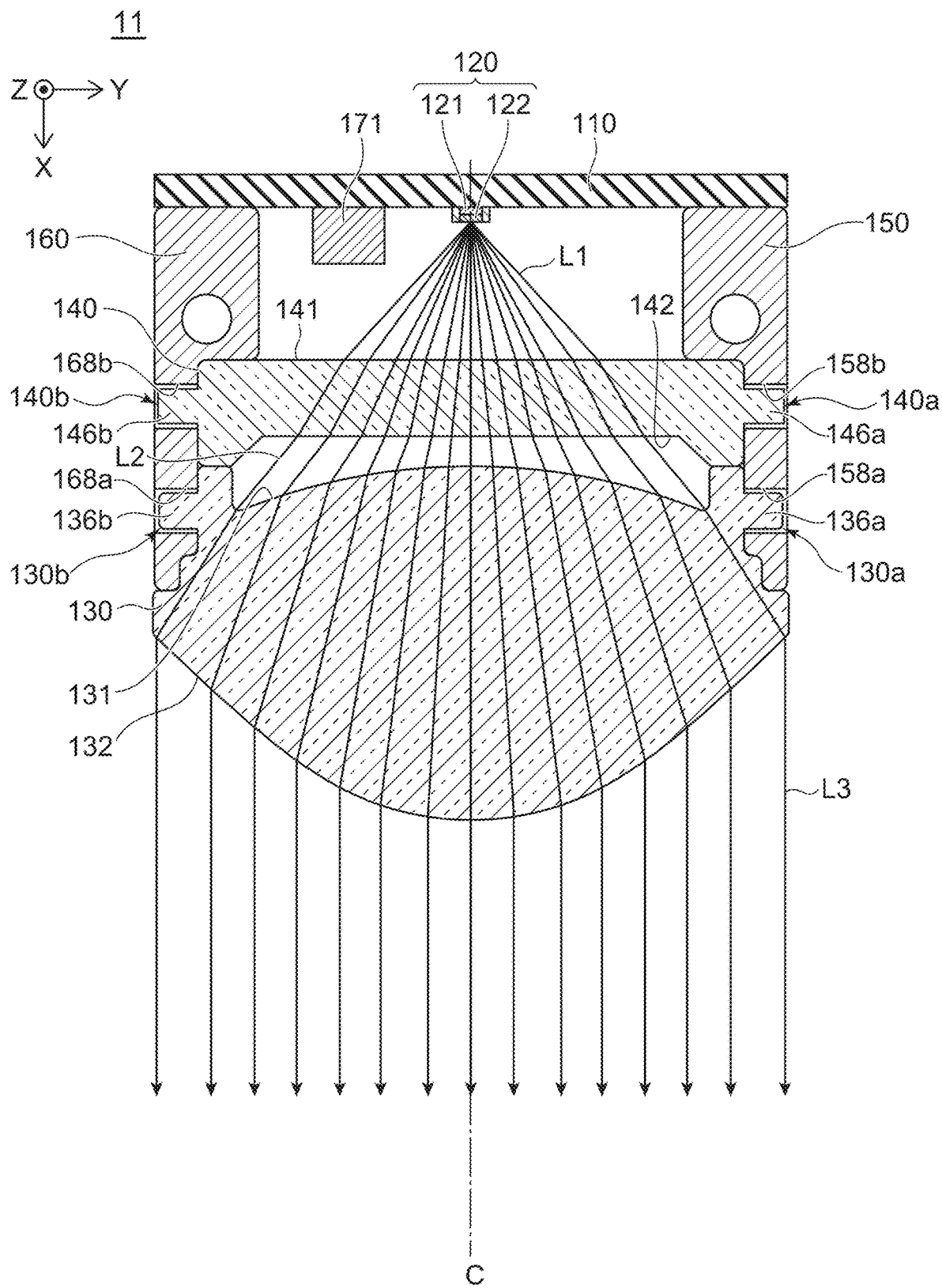
FIG. 5 is a cross-sectional view of the lighting module according to the first embodiment showing a cross section including an optical axis of a light source and parallel to the X-Y plane.

FIG. 5 is a cross-sectional view showing a cross section including an optical axis of a light source of the lighting module according to the present embodiment and parallel to the X-Y plane.

Figure 6:
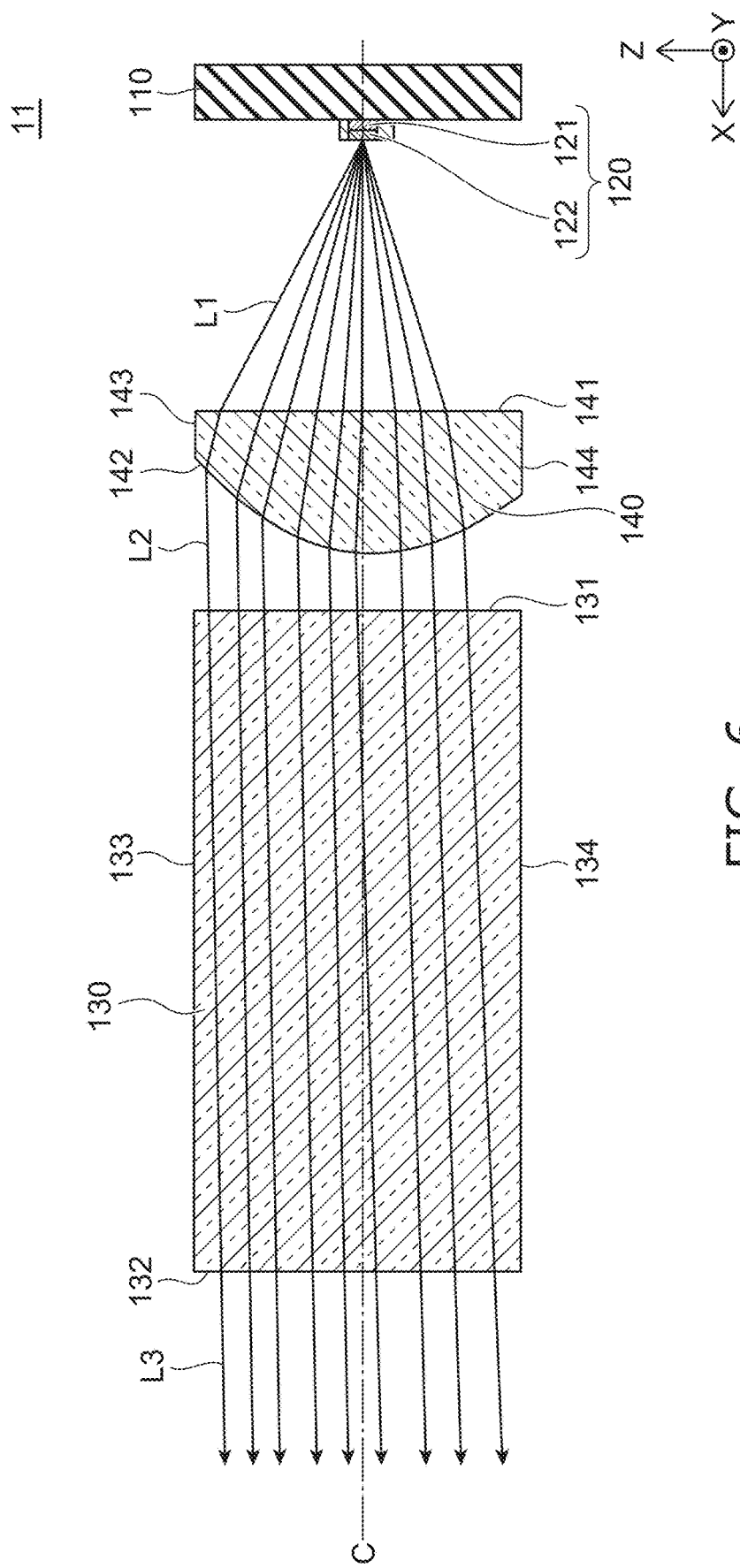
FIG. 6 is a cross-sectional view of the lighting module according to the first embodiment showing a cross section including an optical axis of a light source and parallel to the X-Z plane.

FIG. 6 is a cross-sectional view showing a cross section including the optical axis of the light source of the lighting module according to the present embodiment and parallel to the X-Z plane.

Figure 7:
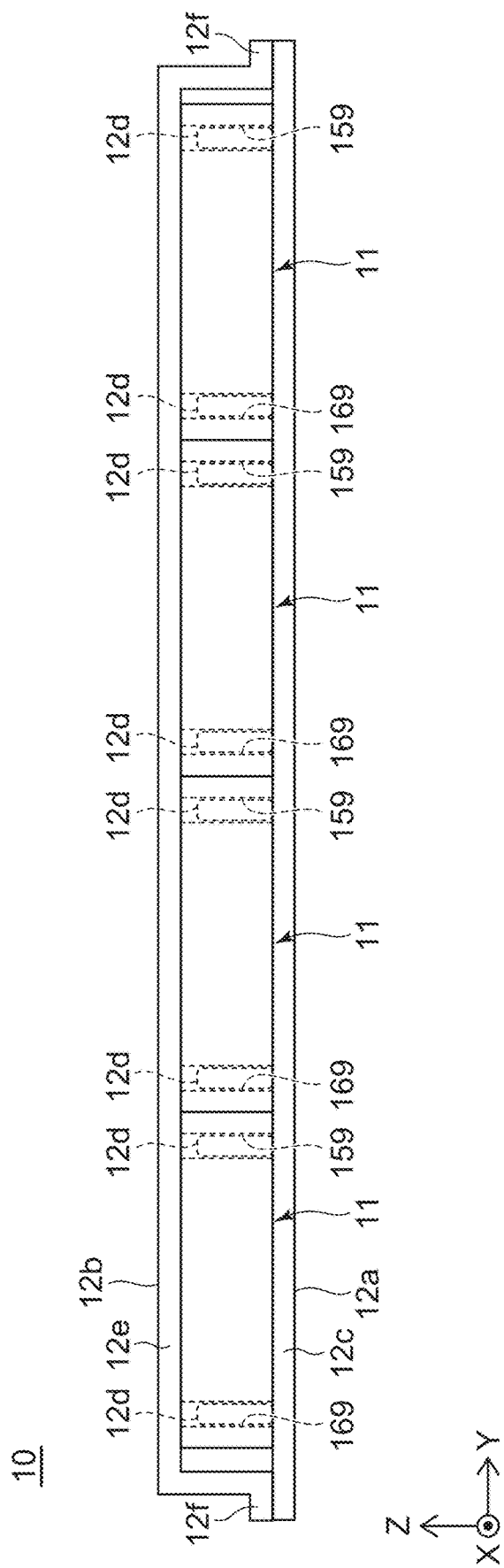
FIG. 7 is a front view showing a lighting device according to the first embodiment.

FIG. 7 is a front view showing a lighting device according to the present embodiment.

Figure 8:
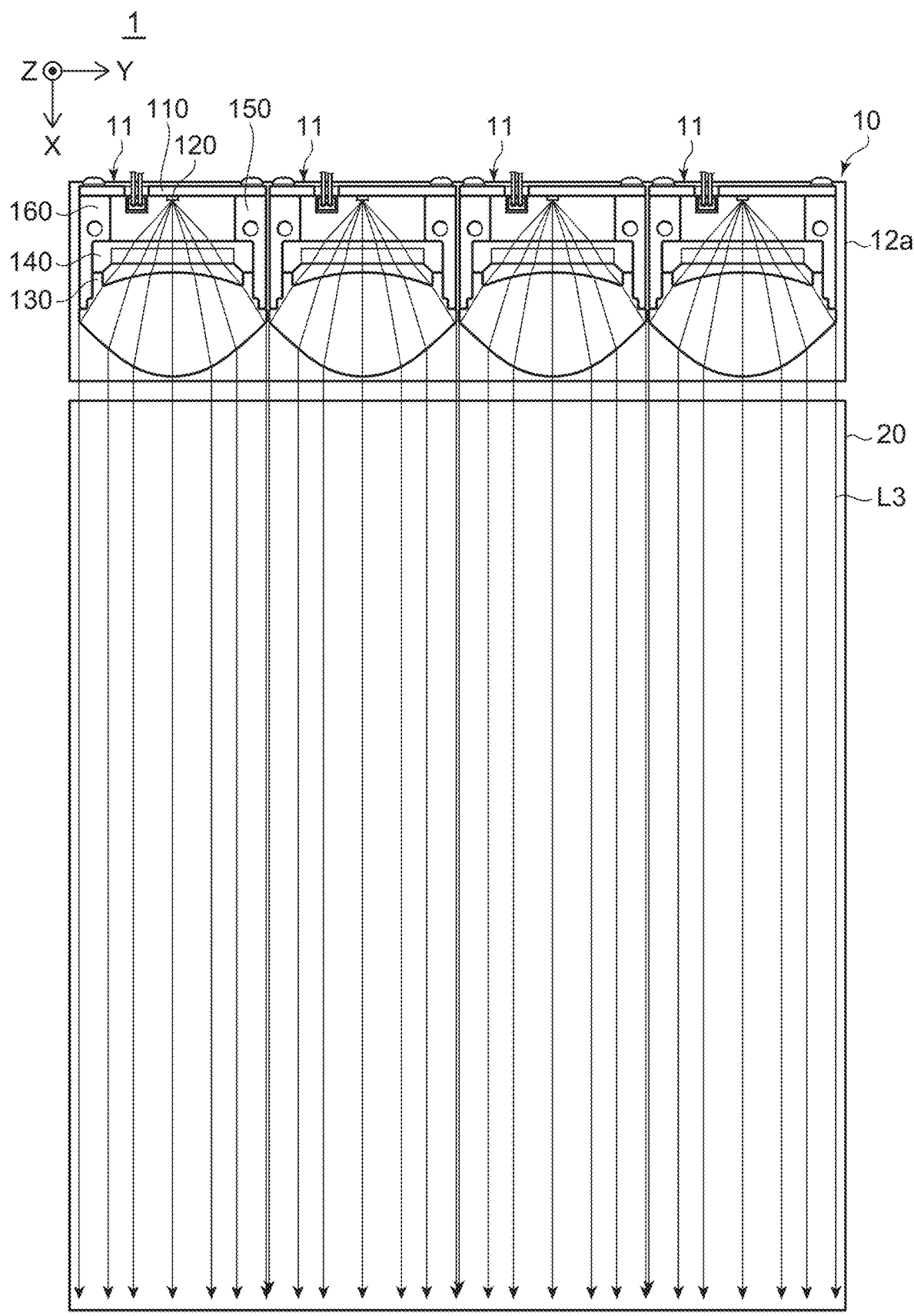
FIG. 8 is a top view showing a display device according to the first embodiment.

FIG. 8 is a top view showing a display device according to the present embodiment.

Figure 9:
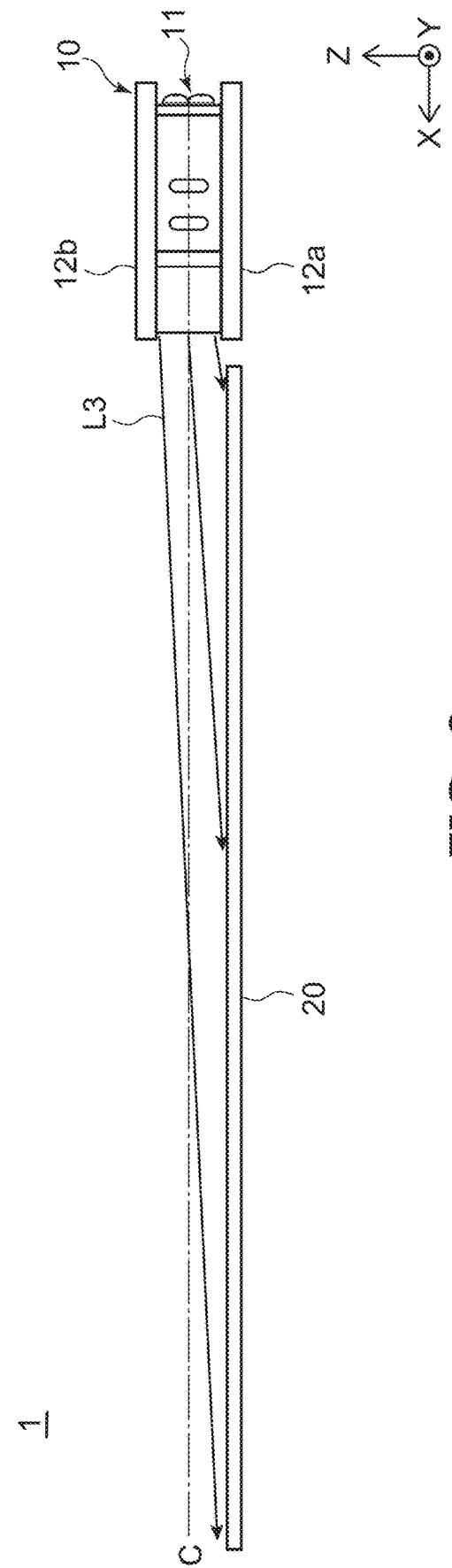
FIG. 9 is a side view showing the display device according to the first embodiment.

FIG. 9 is a side view showing the display device according to the present embodiment.

Figure 10:
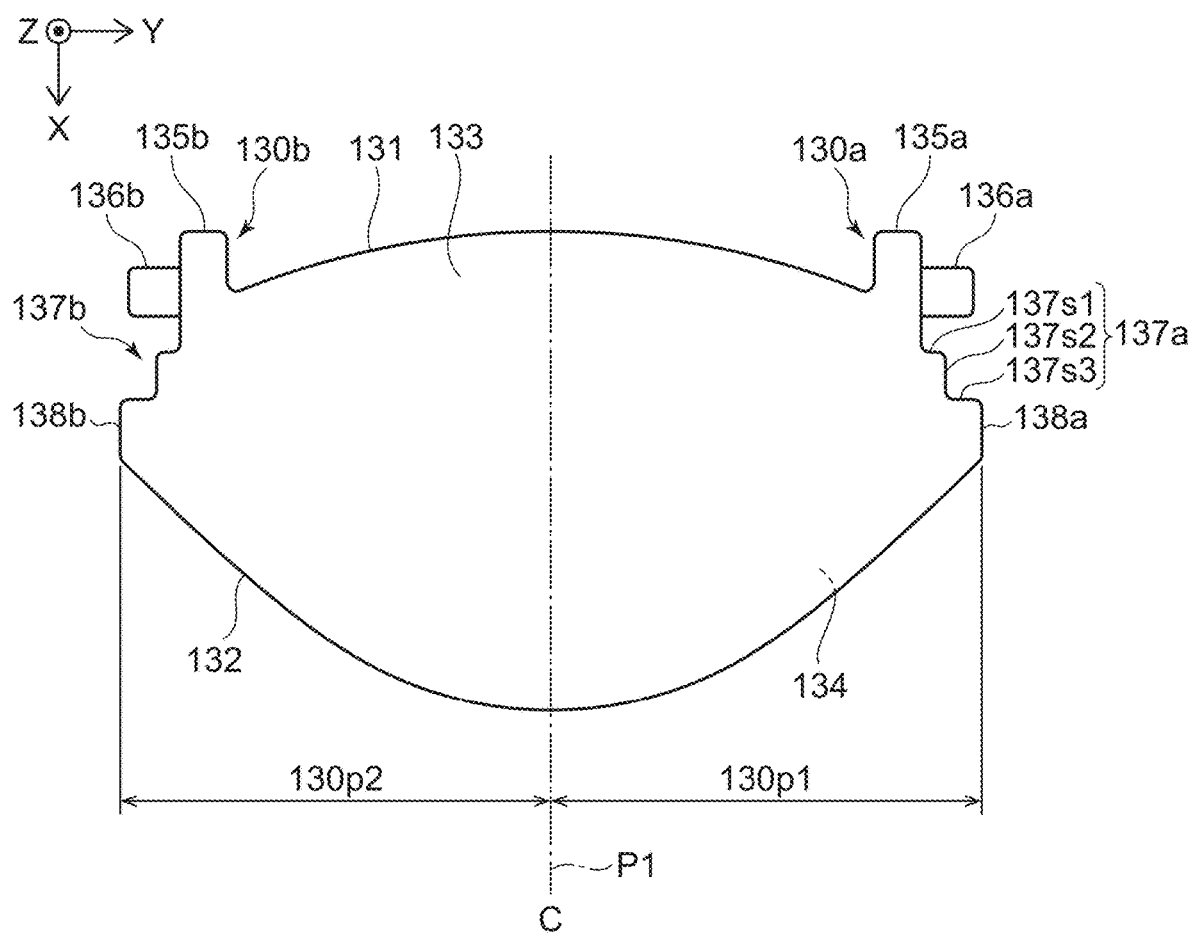
FIG. 10 is a top view showing a first lens.

FIG. 10 is a top view showing a first lens.

Figure 11A:
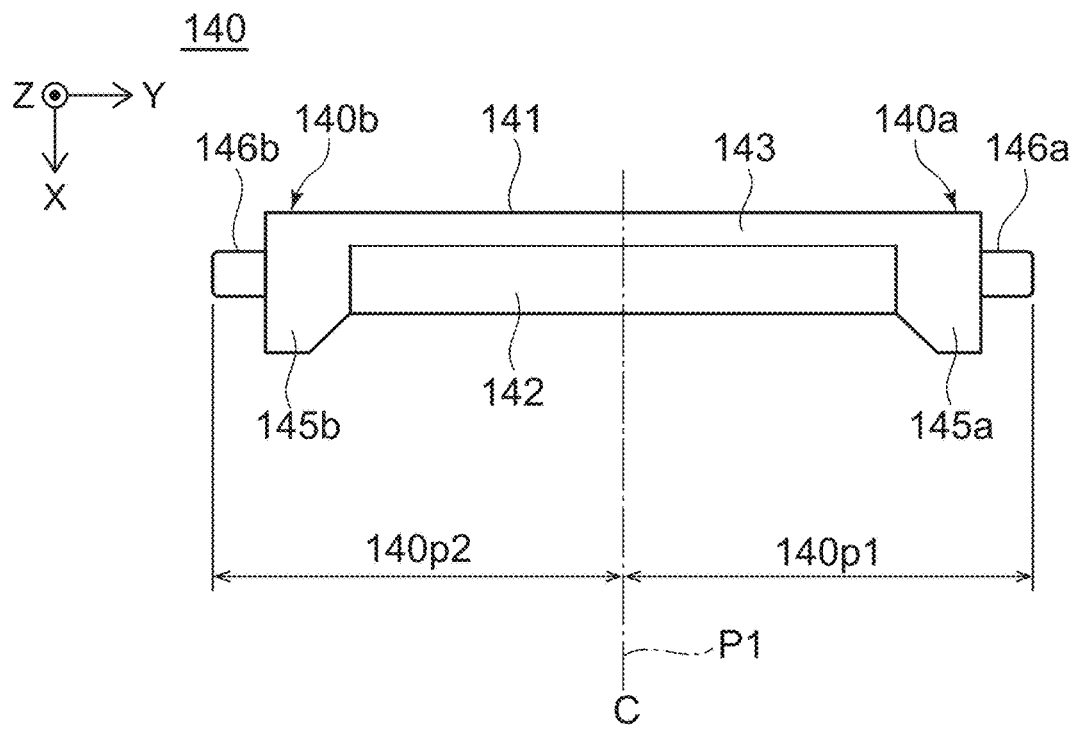
FIG. 11A is a top view showing a second lens.

FIG. 11A is a top view showing a second lens.

Figure 11B:
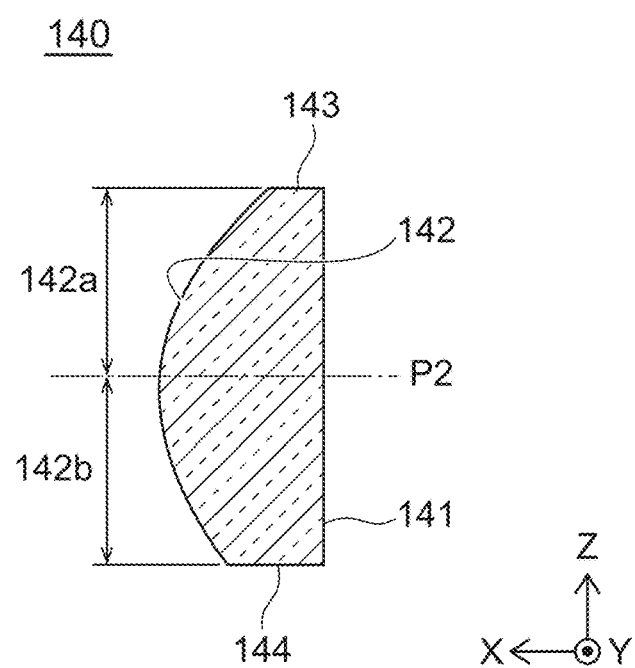
FIG. 11B is a cross-sectional view of the second lens showing a cross section including the optical axis of the light source and parallel to the X-Z plane.

FIG. 11B is a cross-sectional view of the second lens showing a cross section including the optical axis of the light source and parallel to the X-Z plane.

Figure 12:
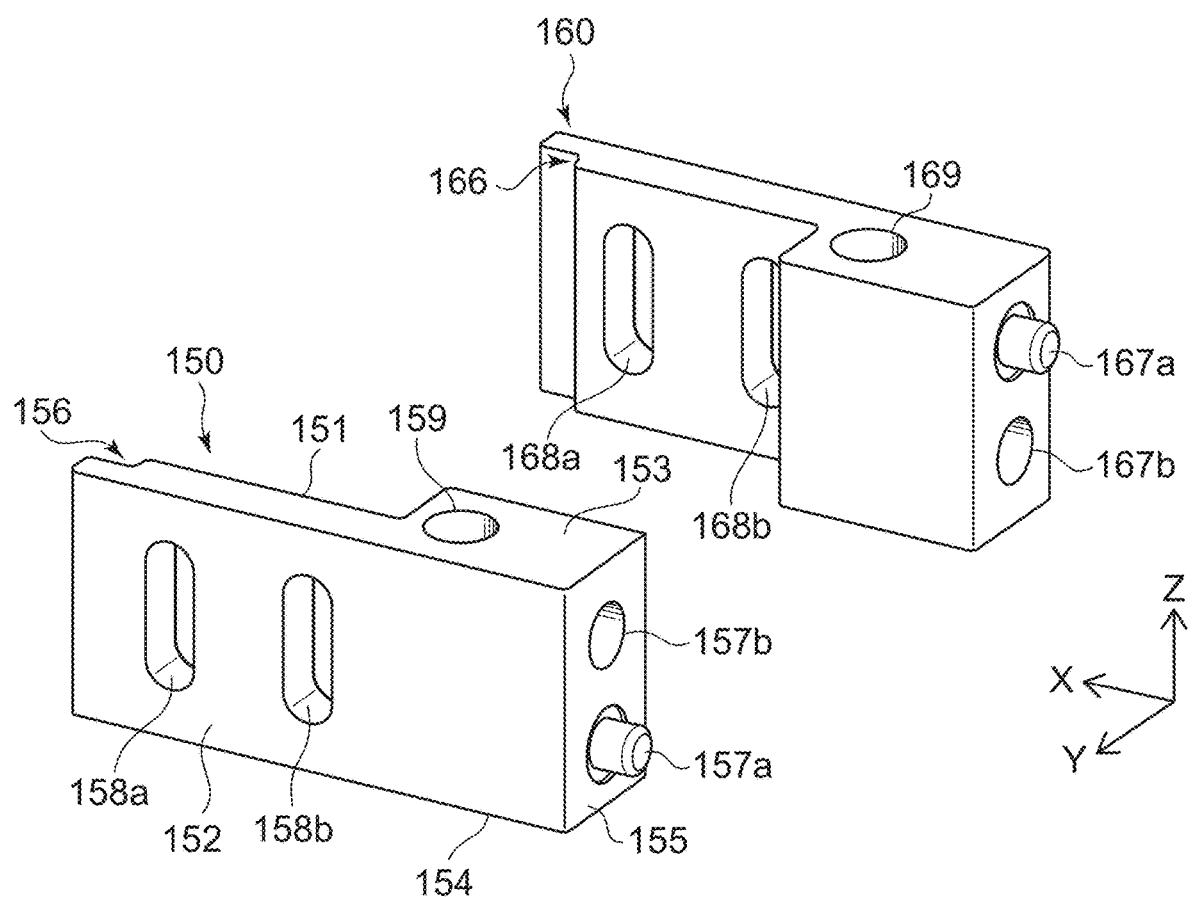
FIG. 12 is a perspective view showing a first holder and a second holder.

FIG. 12 is a perspective view showing a first holder and a second holder.

For ease of understanding of the description in FIG. 4, a first lens 130 described below is illustrated by a solid line; a substrate 110 is illustrated by a thick broken line; and a first holder 150 and a second holder 160 are illustrated by fine broken lines.

As a general description, a lighting module 11 according to the present embodiment includes the substrate 110, a light source 120, the first lens 130, a second lens 140, the first holder 150, and the second holder 160 as shown in FIG. 1. The light source 120 is located on the substrate 110. Light L1 that is emitted from the light source 120 is incident on the first lens 130. The substrate 110 and the first lens 130 are fixed to the first holder 150.

As shown in FIG. 5, light L3 exiting the first lens 130 is parallel light that is parallel to an optical axis C of the light source 120 when viewed from the +Z direction (in other words, a first direction) intersecting the optical axis C. As shown in FIG. 6, the light L3 exiting the first lens 130 is parallel light oblique to the optical axis C when viewed from the +Y direction (in other words, a second direction) intersecting the optical axis C and the +Z direction. As used herein, "the optical axis C of the light source 120" means a straight line that passes through a position, in one plane intersecting the light L1 emitted from the light source 120, at which the illuminance of the light L1 emitted from the light source 120 is the maximum in the one plane and through a position, in another plane separated from the one plane and intersecting the light L1 emitted from the light source 120, at which the illuminance of the light L1 is the maximum in the another plane. Also, "parallel light" means parallel light within a practical range including manufacturing accuracy, assembly accuracy, etc., and encompasses substantially parallel light, of which the light rays are substantially parallel to each other. As used herein, "the light rays are substantially parallel to each other" means that the difference between angles of light rays is, for example, within 5 degrees. Also, "parallel" means parallel within a practical range including manufacturing accuracy, assembly accuracy, etc., and encompasses being substantially parallel. The optical axis C and the light rays of the light L3 being substantially parallel means that the difference between angles of the optical axis C and a light ray of the light L3 is, for example, within 5 degrees.

As shown in FIG. 5, a first end part 130a of the first lens 130 in the +Y direction is fixed to the first holder 150. As shown in FIG. 4, the first holder 150 illustrated by a fine broken line in FIG. 4 does not protrude outward of the first lens 130 illustrated by the solid line in FIG. 4 in the +Y direction when viewed from the +X direction (in other words, a third direction) in which the optical axis C extends.

According to the present embodiment as shown in FIG. 5, the lighting module 11 further includes the second lens 140 and the second holder 160. The second lens 140 is located between the light source 120 and the first lens 130; and the light L1 that is emitted from the light source 120 is incident on the second lens 140. The substrate 110 and a second end part 130b of the first lens 130 in the −Y direction, which is the direction opposite to the +Y direction, are fixed to the second holder 160. As shown in FIG. 4, the second holder 160 indicated by a fine broken line in FIG. 4 does not protrude outward of the first lens 130 indicated by the solid line in FIG. 4 in the −Y direction when viewed from the +X direction.

According to the present embodiment as shown in FIG. 7, the plurality of lighting modules 11 are applied to a lighting device 10. Specifically, the lighting device 10 includes the plurality of lighting modules 11, and fixing members 12a and 12b that fix the plurality of lighting modules 11. The fixing members 12a and 12b are arranged to face the plurality of lighting modules 11 in a state in which the plurality of lighting modules 11 are arranged in the +Y direction.

According to the present embodiment as shown in FIGS. 8 and 9, the lighting device 10 is used in combination with a display member 20. The fixing member 12b is not illustrated in FIG. 8. According to the present embodiment, the display member 20 is a hologram sheet in which interference fringes corresponding to an image to be displayed are recorded. The display member 20 reflects the light L3 having exited the first lenses 130 of the lighting device 10. When light reflected at the display member 20 is incident on pupils of a user, the user can visually recognize the image at the +Z side of the display member 20. Hereinbelow, the device in which the lighting device 10 and the display member 20 are combined is called the "display device 1".

However, the lighting module and the lighting device may be used in combination with another member instead of being used in combination with the display member. Examples of using the lighting device in combination with another member include an example in which the lighting device, configured to emit infrared light serving as a light curtain, and a detector configured to detect the light curtain are used in combination as an area sensor. Also, the lighting device may be used alone. Examples of the lighting device being used alone include an example of using as a sterilization device in which ultraviolet light is emitted from the lighting device, or an example of using as wall lighting with a dimmable light source. The lighting module 11, the lighting device 10, and the display device 1 will now be elaborated.

(Lighting Module)

First, the lighting module 11 will be described in detail.

The substrate 110 includes an insulating layer and wiring parts. As shown in FIG. 2, the substrate 110 has a flat plate shape. The substrate 110 includes a flat front surface 111 substantially parallel to the Y-Z plane, and a flat back surface 112, which is positioned at the −X side opposite to a side at which the front surface 111 is located and is substantially parallel to the Y-Z plane. The shape of the substrate 110 when viewed from the +X direction is, for example, a quadrilateral with rounded corners. Among the four sides forming the outer perimeter of the substrate 110, two opposing sides extend substantially parallel to the Z-direction; and the remaining two opposing sides extend substantially parallel to the Y-direction. However, the shape of the substrate is not limited to the shape described above.

As shown in FIG. 4, the substrate 110 does not protrude outward of the first lens 130 in the +Y direction or the −Y direction when viewed from the +X direction. Also, the substrate 110 does not protrude outward of the first lens 130 in the +Z direction or the −Z direction when viewed from the +X direction. Specifically, a length of the substrate 110 in the Y-direction is not more than a length of the first lens 130 in the Y-direction. Also, a length (the thickness) of the substrate 110 in the Z-direction is not more than a length (the thickness) of the first lens 130 in the Z-direction. However, the substrate may protrude outward of the first lens in the +Z direction, the −Z direction, the +Y direction, or the −Y direction when viewed from the +X direction.

As shown in FIG. 2, two first through-holes 113 that extend through the substrate 110 in the X-direction are formed in the substrate 110. One of the two first through-holes 113 is positioned at the vicinity of the corner portion of the substrate 110 positioned furthest toward the −Y side and furthest toward the −Z side of the substrate 110; and the other is positioned at the vicinity of the corner portion of the substrate 110 positioned furthest toward the +Y side and furthest toward the +Z side of the substrate 110. Two second through-holes 114 that extend through the substrate 110 in the X-direction are formed in the substrate 110. One of the two second through-holes 114 is positioned at the vicinity of the corner portion of the substrate 110 positioned furthest toward the −Y side and furthest toward the +Z side of the substrate 110; and the other is positioned at the vicinity of the corner portion of the substrate 110 positioned furthest toward the +Y side and furthest toward the −Z side of the substrate 110. However, the numbers and positions of the through-holes provided in the substrate are modifiable as appropriate according to the fixing method of the substrate to the holder, etc.

A recess 115 is provided in the substrate 110. According to the present embodiment, the recess 115 is concave in the −Z direction from a side surface of the substrate 110 positioned furthest toward the +Z side.

The light source 120 is located on the front surface 111 of the substrate 110. As shown in FIG. 5, the light source 120 includes a light-emitting element 121 and a wavelength conversion member 122. The light-emitting element 121 is an LED (Light-Emitting Diode), a LD (Laser Diode), etc. A positive and negative pair of electrodes of the light-emitting element 121 is electrically connected respectively to wiring parts of the substrate 110. The wavelength conversion member 122 emits light upon absorbing a portion of the light emitted by the light-emitting element 121. The wavelength conversion member 122 includes, for example, a phosphor.

According to the present embodiment, the light L1 that is emitted from the light source 120 is visible light including the light emitted by the light-emitting element 121 and the light emitted by the wavelength conversion member 122. The optical axis C of the light L1 emitted from the light source 120 extends in the X-direction. It is favorable for the difference between the light emission peak wavelength of the light-emitting element 121 and the light emission peak wavelength of the wavelength conversion member 122 to be not more than 50 nm. As a result, the light source 120 can have high luminance while substantially monochromatic light is emitted from the light source 120. When a lighting module including a light source configured to emit multi-color light is applied to the display device, there are cases where multiple images of different colors may be displayed at mutually shifted positions by the display member, which is a hologram sheet, causing a user to visually recognize a blurred image. Therefore, by setting the L1 emitted from the light source 120 to be substantially monochromatic light, the image that is visually recognized by the user can be clear.

When the display member 20 is a hologram sheet, the peak wavelength of the image generated by the display member 20 is shifted further toward the short wavelength side than the wavelength of the light emitted from the light source 120 according to the incident angle of the light from the lighting module 11 incident on the display member 20. Accordingly, when the peak wavelength of the image generated by the display member 20 is, for example, not more than 530 nm, it is favorable for the wavelength of the light emitted from the light source 120 to be not less than 450 nm and not more than 530 nm, that is, it is favorable for the color of the light L1 emitted from the light source 120 to be turquoise blue.

However, the configuration of the light source is not limited to the configuration described above. For example, the light source does not necessarily include the wavelength conversion member. In such a case, the light that is emitted by the light-emitting element is emitted from the light source. Also, the light source may be configured to emit monochromatic light other than ultraviolet light, infrared light, white light, or turquoise blue according to the application of the lighting module. Also, the greater part of the light emitted by the light-emitting element may be absorbed by the wavelength conversion member; and the light source may mainly emit the light emitted by the wavelength conversion member.

As shown in FIGS. 2 and 3, a connector 171 is located on the front surface 111 of the substrate 110. The connector 171 includes a positive and negative pair of terminals 172a and 172b. Each of the positive and negative pair of terminals 172a and 172b is electrically connected to a respective one of the positive and negative pair of electrodes of the light-emitting element 121 via wiring parts of the substrate 110. Each of wiring members 173 is electrically connected to a respective one of the positive and negative pair of terminals 172a and 172b. The wiring members 173 are extended to the −X side of the substrate 110 via the recess 115 of the substrate 110. With this structure, the wiring members 173 can be prevented from protruding outward of the first lens 130 toward the +Z side when viewed from the +X direction.

However, the method of extending the wiring members toward the −X side so that the wiring members do not protrude further toward the +Z side than the first lens is not limited to the method described above. For example, the recess that is provided in the substrate to extend the wiring members may be recessed toward the +Z side from a lateral surface of the substrate positioned furthest toward the −Z side. Also, a through-hole that extends through the substrate in the +X direction may be provided in the substrate; and the wiring members may extend toward the −X side through the through-hole. Also, the wiring parts of the substrate may extend from the front surface to the back surface; and the connector may be located at the back surface of the substrate. In such a case, the need to dispose the connector at the front surface can be eliminated, which can eliminate the need of a recess or through-hole for extending the wiring members to the −X side of the substrate. Also, the wiring members may protrude outward of the first lens in the +Z direction or the −Z direction when viewed from the +X direction.

The first lens 130 and the second lens 140 are located on the optical axis C of the light source 120. The second lens 140 is located at the +X side of the light source 120. The first lens 130 is located at the +X side of the second lens 140. As shown in FIG. 5, the light L1 that is emitted from the light source 120 is incident on the second lens 140. Light L2 that is emitted from the light source 120 and travels via the second lens 140 is incident on the first lens 130.

The first lens 130 and the second lens 140 each can include light-transmitting materials. The light-transmitting materials are, for example, a resin material such as acrylic (PMMA), polycarbonate (PC), or the like, quartz glass, etc. It is favorable for the refractive indexes of the light-transmitting materials included in the first and second lenses 130 and 140 to be about 1.4 to 1.9. However, the refractive indexes of the light-transmitting materials included in the first and second lenses are not limited to these ranges.

As shown in FIG. 10, when the first lens 130 is divided into a first part 130p1 and a second part 130p1 by, as a boundary, a plane P1 in which the optical axis C extends and is parallel to the X-Z plane, the first part 130p1 and the second part 130p1 have shapes that are substantially symmetric with respect to the plane P1. Specifically, the surface of the first lens 130 includes a first light incident surface 131 on which the light L2 traveling via the second lens 140 is incident, a first light-emitting surface 132 positioned at the +X side, which is the side opposite to the first light incident surface 131, a first surface 133 positioned between the +Z direction edge of the first light incident surface 131 and the +Z direction edge of the first light-emitting surface 132, and a second surface 134 positioned between the −Z direction edge of the first light incident surface 131 and the −Z direction edge of the first light-emitting surface 132.

The first light incident surface 131 is curved to be convex in the −X direction when viewed from the +Z direction. The apex of the first light incident surface 131 is positioned substantially on the optical axis C when viewed from the +Z direction. The first light incident surface 131 extends substantially parallel to the Z-direction. The first light-emitting surface 132 is curved to be convex in the +X direction when viewed from the +Z direction. The apex of the first light-emitting surface 132 is positioned substantially on the optical axis C when viewed from the +Z direction. The first light-emitting surface 132 extends substantially parallel to the Z-direction. The curvature of the first light-emitting surface 132 is greater than the curvature of the first light incident surface 131. The length of the first light incident surface 131 in the Y-direction is less than the length of the first light-emitting surface 132 in the Y-direction. The +Z direction edge of the first light incident surface 131 and the +Z direction edge of the first light-emitting surface 132 each extend in the Y-direction. Similarly, the −Z direction edge of the first light incident surface 131 and the −Z direction edge of the first light-emitting surface 132 each extend in the Y-direction. As shown in FIG. 6, the first surface 133 and the second surface 134 each are flat and substantially parallel to the X-Y plane. The first surface and/or the second surface may be coated to be dark-colored or black to be light-absorbing. Also, an unevenness may be provided in the first surface and/or the second surface by performing surface texturing, etc.

As shown in FIG. 10, a protrusion 135a that extends in the −X direction is connected to the +Y direction end portion of the first light incident surface 131. A projection 136a protrudes in the +Y direction from the protrusion 135a. A step portion 137a is located between the +X direction end portion of the protrusion 135a and the +Y direction end portion of the first light-emitting surface 132. The step portion 137a includes a surface 137s1 that is connected to the +X direction end portion of the protrusion 135a, is flat, and is substantially parallel to the Y-Z plane, a surface 137s2 that is connected to the +Y direction end portion of the surface 137s1, is flat, and is substantially parallel to the X-Z plane, and a surface 137s3 that is connected to the +X direction end portion of the surface 137s2, is flat, and is substantially parallel to the Y-Z plane. A side surface 138a that is flat and substantially parallel to the X-Z plane is positioned between the +Y direction end portion of the surface 137s3 and the +Y direction end portion of the first light-emitting surface 132. Thus, the protrusion 135a, the projection 136a, the step portion 137a, and the side surface 138a are included in the first end part 130a of the first lens 130 in the +Y direction.

Similarly, the second end part 130b of the first lens 130 in the −Y direction includes a protrusion 135b, a projection 136b, a step portion 137b, and a side surface 138b. The protrusion 135b, the projection 136b, the step portion 137b, and the side surface 138b have shapes that are respectively substantially symmetric to the protrusion 135a, the projection 136a, the step portion 137a, and the side surface 138a with respect to the plane P1.

As shown in FIG. 11A, when the second lens 140 is divided into a third part 140p1 and a fourth part 140p2 by the plane P1 as a boundary, the third part 140p1 and the fourth part 140p2 have shapes that are substantially symmetric with respect to the plane P1. Specifically, as shown in FIGS. 11A and 11B, the surface of the second lens 140 includes a second light incident surface 141 on which the light L1 emitted from the light source 120 is incident and which extends substantially parallel to the Y-direction, a second light-emitting surface 142 that is positioned at the +X side, which is the side opposite to the second light incident surface 141, and extends substantially parallel to the Y-direction, a third surface 143 positioned between the +Z direction edge of the second light incident surface 141 and the +Z direction edge of the second light-emitting surface 142, and a fourth surface 144 positioned between the −Z direction edge of the second light incident surface 141 and the −Z direction edge of the second light-emitting surface 142.

As shown in FIG. 11B, the second light incident surface 141 is flat and substantially parallel to the Y-Z plane. The second light-emitting surface 142 is curved to be convex in the +X direction when viewed from the +Y direction. When the second light-emitting surface 142 is divided into a first region 142a and a second region 142b by, as a boundary, a plane that P2 passes through the +Z direction center of the second light-emitting surface 142 and is orthogonal to the +Z direction, the first region 142a and the second region 142b have shapes that are asymmetric with respect to the plane P2. Specifically, the second region 142b is positioned at the −Z side of the first region 142a. Also, the curvature of the second region 142b is less than the curvature of the first region 142a. The +Z direction edge of the second light incident surface 141 and the +Z direction edge of the second light-emitting surface 142 each extend in the Y-direction. Similarly, the −Z direction edge of the second light incident surface 141 and the −Z direction edge of the second light-emitting surface 142 each extend in the Y-direction. The third surface 143 and the fourth surface 144 are flat and substantially parallel to the X-Y plane. The third surface and/or the fourth surface may be coated to be dark-colored or black to be light-absorbing. Also, an unevenness may be provided in the third surface and/or the fourth surface by performing surface texturing, etc.

A protrusion 145a that extends in the +X direction is connected to the +Y direction end portion of the second light incident surface 141 and the +Y direction end portion of the second light-emitting surface 142. A projection 146a protrudes in the +Y direction from the protrusion 145a. Thus, a third end portion 140a of the second lens 140 in the +Y direction includes the protrusion 145a and a projection 146b.

Similarly, a fourth end portion 140b of the second lens 140 in the −Y direction includes a protrusion 145b and the projection 146b. The protrusion 145b and the projection 146b have shapes that are respectively substantially symmetric to the protrusion 145a and the projection 146a with respect to the plane P1.

As shown in FIG. 5, the length of the second lens 140 in the Y-direction is not more than the length of the first lens 130 in the Y-direction. As shown in FIG. 6, a length of the second lens 140 in the X-direction is not more than a length of the first lens 130 the X-direction. Also, a length of the second lens 140 in the Z-direction is substantially equal to a length of the first lens 130 in the Z-direction.

The second lens 140 condenses the light L1 emitted from the light source 120 when viewed from the +Y direction. This allows the light incident on the first lens 130 to be inhibited from being totally reflected at the first surface 133 and/or the second surface 134 of the first lens 130. Also, as described above, the curvature of the second region 142b is less than the curvature of the first region 142a, and thus the light L2 emitted from the second light-emitting surface 142 is emitted in a direction that is oblique to the optical axis C and is toward the +X/−Z direction.

As shown in FIG. 5, the first lens 130 condenses the light L2 traveling via the second lens 140 when viewed from the +Z direction. As a result, the first lens 130 emits the light L3 substantially parallel to the optical axis C when viewed from the +Z direction. As described above, the light L2 exiting the second lens 140 propagates in a direction that is oblique to the optical axis C and is toward the +X/−Z direction when viewed from the +Y direction.

Accordingly, as shown in FIG. 6, similarly to the light L2, the light L3 exiting the first lens 130 also propagates in a direction that is oblique to the optical axis C and is toward the +X/−Z direction when viewed from the +Y direction.

According to the present embodiment, the light L3 that is exiting the first lens 130 is substantially parallel light when viewed from both the +Z direction and the +Y direction. However, the light L3 when viewed from the +Z direction is closer to perfectly parallel light than the light L3 when viewed from the +Y direction. When viewed from the +Z direction, it is favorable for the angular difference between the light rays of the light L3 to be, for example, not more than 2 degrees; and when viewed from the +Y direction, it is favorable for the angular difference between the light rays of the light L3 to be, for example, not more than 5 degrees. Therefore, the light distribution angle of the light L3 when viewed from the +Z direction is less than the light distribution angle of the light L3 when viewed from the +Y direction. However, the magnitude relationship between the light distribution angle when the light exiting the first lens is viewed from the +Z direction and the light distribution angle when the light exiting the first lens is viewed from the +Y direction is not limited to the magnitude relationship described above.

As described above, the part of the first lens 130 that functions as the lens and includes the first light incident surface 131 and the first light-emitting surface 132 is a cylindrical lens having substantially the same cross-sectional shape orthogonal to the Z-direction. Similarly, the part of the second lens 140 that functions as the lens and includes the second light incident surface 141 and the second light-emitting surface 142 is a cylindrical lens having substantially the same cross-sectional shape orthogonal to the Y-direction.

As used herein, the term "cylindrical lens" includes not only lenses having surfaces corresponding to portions of side surfaces of circular columns or cylinders, but also lenses, as in the present embodiment, that have surfaces corresponding to curved surfaces other than side surfaces of circular columns or cylinders.

However, the shapes of the first and second lenses are not limited to those described above as long as the light exiting the first lens is substantially parallel light that is substantially parallel to the optical axis C when viewed from the +Z direction and substantially parallel light that is oblique to the optical axis C when viewed from the +Y direction. Also, the number of lenses included in the lighting module may be one, three, or more. Also, the first lens and the second lens may be a continuous body.

As shown in FIG. 3, the first holder 150 and the second holder 160 each are positioned between the substrate 110 and the first light-emitting surface 132 of the first lens 130.

The first holder 150 extends from the substrate 110 toward the first end part 130a of the first lens 130. As shown in FIG. 12, the surface of the first holder 150 includes a first holder surface 151 facing the first lens 130 and the second lens 140, a second holder surface 152 positioned at the +Y side, which is the side opposite to the first holder surface 151, a third holder surface 153 positioned between the +Z direction end portion of the first holder surface 151 and the +Z direction end portion of the second holder surface 152, a fourth holder surface 154 positioned at the −Z side, which is the side opposite to the third holder surface 153, and a fifth holder surface 155 facing the substrate 110.

As shown in FIG. 3, the first holder surface 151 includes a surface 151s1 that is flat and substantially parallel to the X-Z plane, a surface 151s2 that is connected to the +X direction end portion of the surface 151s1, is flat, and is substantially parallel to the Y-Z plane, a surface 151s3 that is connected to the +Y direction end portion of the surface 151s2, is flat, and is substantially parallel to the X-Z plane, a surface 151s4 that is connected to the +X direction end portion of the surface 151s3, is flat, and is substantially parallel to the Y-Z plane, a surface 151s5 that is connected to the +Y direction end portion of the surface 151s4, is flat, and is substantially parallel to the X-Z plane, and a surface 151s6 that is connected to the +X direction end portion of the surface 151s5, is flat, and is substantially parallel to the Y-Z plane. The surfaces 151s4, 151s5, and 151s6 are included in a step portion 156 that has a shape corresponding to the shape of the step portion 137a of the first lens 130. The second holder surface 152 is flat and substantially parallel to the X-Z plane. As shown in FIG. 4, the third holder surface 153 and the fourth holder surface 154 each are flat and substantially parallel to the X-Y plane.

As shown in FIG. 12, the fifth holder surface 155 is flat and substantially parallel to the Y-Z plane. The fifth holder surface 155 includes a projection 157a that protrudes in the −X direction. A threaded hole 157b that extends from the fifth holder surface 155 in the +X direction is provided in the first holder 150. The threaded hole 157b is positioned at the +Z side of the projection 157a.

The first holder 150 includes a through-hole 158a in which the projection 136a of the first lens 130 can be located, and a through-hole 158b in which the projection 146a of the second lens 140 can be located. The through-holes 158a and 158b each extend through the first holder 150 in the Y-direction.

A through-hole 159 that extends through the first holder 150 in the Z-direction is provided in the first holder 150.

The second holder 160 has the shape of the first holder 150 rotated 180 degrees around the optical axis C as the central axis. Accordingly, the second holder 160 includes a step portion 166 that has a shape corresponding to the shape of the step portion 137b of the first lens 130, a projection 167a, a threaded hole 167b, a through-hole 168a in which the projection 136b of the first lens 130 can be located, a through-hole 168b in which the projection 146b of the second lens 140 can be located, and a through-hole 169.

A fixing method of the substrate 110, the first lens 130, and the second lens 140 to the first and second holders 150 and 160 will now be described. As shown in FIG. 3, the first lens 130 is arranged so that the step portions 137a and 137b face the step portions 156 and 166 of the holders 150 and 160, and the projections 136a and 136b are positioned inside the through-holes 158a and 168a of the holders 150 and 160. Also, the second lens 140 is arranged so that the projections 146a and 146b are positioned inside the through-holes 158b and 168b of the holders 150 and 160. As shown in FIG. 2, the projections 157a and 167a of the holders 150 and 160 are located inside the second through-holes 114 of the substrate 110. Screws are inserted through the first through-holes 113 of the substrate 110 and are screwed into the threaded holes 157b and 167b of the holders 150 and 160. As a result, the substrate 110, the first lens 130, and the second lens 140 are fixed to the first and second holders 150 and 160.

As shown in FIG. 4, when viewed from the +X direction, the first holder 150 does not protrude outward of the first lens 130 in the +Y direction; and the second holder 160 does not protrude outward of the first lens 130 in the −Y direction. Also, when viewed from the +X direction, the first holder 150 does not protrude outward of the first lens 130 in the +Z direction and the −Z direction; and the second holder 160 does not protrude outward of the first lens 130 in the +Z direction and the −Z direction. Therefore, only the first light-emitting surface 132 of the first lens 130 is visually recognized when the lighting module 11 is viewed from the +X direction. It is therefore easy for the adjacent lighting modules 11 to approach each other when the plurality of lighting modules 11 are arranged in the Y-direction. Also, as a result, the length (the thickness) in the Z-direction of the lighting module 11 can be the thickness of the first lens 130. Therefore, the lighting module 11 can be thinner. However, the holders may protrude from the first lens in the +Z direction or the −Z direction when viewed from the +X direction.

The first holder 150 and the second holder 160 can include resin members or metal materials. It is favorable for the first and second holders 150 and 160 to be light-shielding. Specifically, it is favorable for the surfaces of the first and second holders 150 and 160 to be dark-colored, and more favorably black.

However, the shapes of the first and second holders, the fixing methods of the lenses to the holders, and the fixing methods of the substrate to the holders are not limited to the fixing method described above. For example, recesses may be provided in the holders instead of the through-holes in which the projections of the lenses can be located. Also, for example, recesses or through-holes may be provided in the lenses; and projections that are configured to be located inside recesses or through-holes of the lenses may be provided in the holders. Also, the holders and the lenses may be fixed by fixtures such as screws, rivets, etc. Also, the first holder and the second holder may be a continuous body as long as the arrangement of the light source and the lenses and the propagation of the light are not obstructed.

(Lighting Device)

The lighting device 10 will now be elaborated.

One lighting module 11 can irradiate light by being driven by electrically connecting the wiring members 173 to a power supply, and can therefore perform the lighting function even when alone. Also, in the one lighting module 11, the substrate 110 with the light source 120, the first lens 130, and the second lens 140 are integrated and made structurally complete by the first and second holders 150 and 160. Therefore, the user can easily form the lighting device 10 that has the desired Y-direction irradiation range by arranging the lighting modules 11 in the Y-direction as shown in FIG. 7 to match the desired Y-direction irradiation range, and by preparing the fixing members 12a and 12b to correspond to the number of the lighting modules 11.

According to the present embodiment, the adjacent lighting modules 11 contact each other. However, the adjacent lighting modules 11 may be separated from each other. It is favorable for the distance between the adjacent lighting modules 11 to be not more than 0.2 mm. This allows a region between the irradiation regions of the adjacent lighting modules 11 to be inhibited from becoming dark.

The fixing member 12a is located at the −Z side of the plurality of lighting modules 11. The fixing member 12a includes a flat plate part 12c facing the plurality of lighting modules 11, and a plurality of projections 12d that protrude from the flat plate part 12c in the +Z direction and are arranged in the Y-direction. The projections 12d are located inside the through-holes 159 and 169 of the holders 150 and 160.

The fixing member 12b is located at the +Z side of the fixing member 12a and the plurality of lighting modules 11. The fixing member 12b includes a flat plate part 12e facing the plurality of lighting modules 11, and a mounting part 12f that extends toward the fixing member 12a from the +Y direction end portion and the −Y direction end portion of the flat plate part 12e, and is mounted by fixtures such as screws, rivets, etc., to the fixing member 12a.

The fixing members 12a and 12b can include resin members or metal materials. It is favorable for the fixing members 12a and 12b to be light-shielding. Specifically, it is favorable for the surfaces of the fixing members 12a and 12b to be dark-colored, and more favorably black.

However, the shapes of the fixing members are not limited to the shapes described above. Also, the fixing methods of the plurality of lighting modules to the fixing members are not limited to the fixing methods described above. For example, the plurality of lighting modules may be fixed to the fixing members by providing threaded holes corresponding to the through-holes extending through the holders in the +Z direction and by inserting screws into the through-holes of the holders and the threaded holes of the fixing members without providing projections in the fixing members.

(Display Device)

The display device 1 will now be elaborated.

As shown in FIGS. 8 and 9, the user can apply the lighting device 10 to the display device 1 in combination with the display member 20, which is a hologram sheet. The user prepares the lighting device 10 corresponding to a length of the display member 20 in the Y-direction. Then, the lighting device 10 is located at the −X side of the display member 20.

The light L3 that is exiting the first lens 130 of each lighting module 11 is substantially parallel light when viewed from the +Z direction as shown in FIG. 8. Therefore, light rays emitted from adjacent first lenses 130 can be inhibited from intersecting with each other. As a result, the user can visually recognize a clear image.

Also, as shown in FIG. 9, when viewed from the +Y direction, the light L3 is oblique to the optical axis C toward the +X/−Z direction. Therefore, the lighting device 10 can irradiate light in a wide range of the display member 20 in the X-direction merely by arranging the lighting device 10 and the display member 20 parallel to the X-Y plane, even without the user adjusting the relative orientations of the lighting device 10 and the display member 20. Also, the lighting device 10 can irradiate the light in a wide range of the display member 20 in the X-direction even when the lighting device 10 is located proximate to the display member 20.

Also, as described above, the occurrence of total reflection inside the first lens 130 can be suppressed by the second lens 140. As a result, the light rays exiting the first lens 130 can be inhibited from intersecting with each other when viewed from the +Y direction. Therefore, the user can visually recognize an even clearer image.

However, the configuration of the display device is not limited to the configuration described above. For example, a display member may be included in an arc three-dimensional display or the like, and may be a light guide plate in which multiple arc-like scratches corresponding to the image to be displayed are provided.

Effects of the present embodiment will now be described.

In the lighting module 11 according to the present embodiment, the light L3 exiting the first lens 130 is substantially parallel light that is substantially parallel to the optical axis C when viewed from the +Z direction intersecting the optical axis C of the light source 120. Therefore, when the plurality of lighting modules 11 are arranged in the Y-direction, the light rays of adjacent lighting modules 11 can be inhibited from intersecting with each other. As a result, for example, when the lighting modules 11 are applied to the display device 1, the user can visually recognize a clear image.

Also, the light L3 exiting the first lens 130 is substantially parallel light oblique to the optical axis C when viewed from the +Y direction intersecting the optical axis C and the +Z direction. Therefore, the lighting module 11 can irradiate the light in a wide range in the X-direction even when located proximate to the illumination object.

Also, the first end part 130*a* of the first lens 130 in the +Y direction is fixed to the first holder 150; and the first holder 150 does not protrude outward of the first lens 130 in the +Y direction when viewed from the +X direction in which the optical axis C extends. Therefore, the adjacent lighting modules 11 can approach each other when the plurality of lighting modules 11 are arranged in the Y-direction. As a result, a region between the irradiation regions of adjacent lighting modules 11 can be inhibited from being dark.

Also, the first holder 150 does not protrude outward of the first lens 130 in the +Z direction or the direction opposite to the +Z direction (the −Z direction) when viewed from the +X direction. As a result, the lighting device 10 can be smaller in the Z-direction.

Also, the lighting module 11 further includes the second holder 160 to which the substrate 110 and the second end part 130*b* of the first lens 130 in the direction opposite to the +Y direction (the −Y direction) are fixed. The second holder 160 does not protrude outward of the first lens 130 in the −Y direction when viewed from the +X direction. Therefore, the first lens 130 and the second lens 140 can be securely fixed to the substrate 110 by the two holders 150 and 160. Also, when the plurality of lighting modules 11 are arranged in the Y-direction, a region between the irradiation regions of adjacent lighting modules 11 can be inhibited from being dark.

Also, the first holder 150 is light-shielding. Therefore, when the plurality of lighting modules 11 are arranged in the Y-direction, the propagation of light from one of the adjacent lighting modules 11 to the other can be suppressed. As a result, for example, when the lighting modules 11 are applied to the display device 1, the user can visually recognize a clear image.

Also, the lighting module 11 further includes the second lens 140 that is located between the light source 120 and the first lens 130, and on which the light L1 emitted from the light source 120 is incident. The second lens 140 is fixed to the first holder 150. The light L2 that is emitted from the light source 120 and travels via the second lens 140 is incident on the first lens 130.

The second lens 140 condenses the light L1 emitted from the light source 120 when viewed from the +Y direction. Therefore, total reflection of the light inside the first lens 130 can be inhibited. The first lens 130 condenses the light L2 that has traveled via the second lens 140 when viewed from the +Z direction. As a result, the light L3 exiting the first lens 130 can be substantially parallel light.

Also, the first lens 130 includes the first light incident surface 131 on which the light L2 traveling via the second lens 140 is incident, and the first light-emitting surface 132 that is positioned at the side opposite to the first light incident surface 131 and is curved to be convex when viewed from the +Z direction. Therefore, the first lens 130 can condense the light L2 that has traveled via the second lens 140 when viewed from the +Z direction. Also, the second lens 140 includes the second light incident surface 141 on which the light L1 emitted from the light source 120 is incident, and the second light-emitting surface 142 that is positioned at the side opposite to the second light incident surface 141 and is curved to be convex when viewed from the +Y direction. As a result, the second lens 140 can condense the light L1 emitted from the light source 120 when viewed from the +Y direction.

Also, the +Z direction edge of the first light incident surface 131 and the +Z direction edge of the first light-emitting surface 132 each extend in the +Y direction. The edge of the first light incident surface 131 in the direction opposite to the +Z direction (the −Z direction) and the edge of the first light-emitting surface 132 in the direction opposite to the +Z direction extend in the +Y direction. The first lens 130 further includes the first surface 133 positioned between the +Z direction edge of the first light incident surface 131 and the +Z direction edge of the first light-emitting surface 132, and the second surface 134 positioned between the edge of the first light incident surface 131 in the direction opposite to the +Z direction (the −Z direction) and the edge of the first light-emitting surface 132 in the direction opposite to the +Z direction. Therefore, the lighting module 11 can be thinner.

Also, when the second light-emitting surface 142 is divided into the first region 142a and the second region 142b by, as a boundary, the plane P2 that passes through the +Z direction center of the second light-emitting surface 142 and is orthogonal to the +Z direction, the first region 142a and the second region 142b are asymmetric with respect to the plane P2. Therefore, the second lens 140 can emit the light L2 in a direction oblique to the optical axis C.

Also, the substrate 110 does not protrude outward of the first lens 130 in the +Y direction or the direction opposite to the +Y direction (the −Y direction) when viewed from the +X direction. Therefore, when the plurality of lighting modules 11 are arranged in the Y-direction, the adjacent lighting modules 11 easily approach each other.

Also, the through-hole 158a is provided in the first holder 150; and the first lens 130 includes the projection 136a configured to be located inside the through-hole 158a. Therefore, the first lens 130 can be easily fixed to the first holder 150.

Also, the lighting device 10 includes a plurality of lighting modules 11, and the fixing members 12a and 12b configured to fix the plurality of lighting modules 11. The fixing members 12a and 12b are arranged to face the plurality of lighting modules 11 in the +Z direction in a state in which the plurality of lighting modules 11 are arranged in the Y-direction. The user can adjust the number of the lighting modules 11 included in the lighting device 10 to match the desired Y-direction irradiation range. Therefore, the lighting device 10 that is very convenient can be provided.

Second Embodiment

A second embodiment will now be described.

Figure 13:
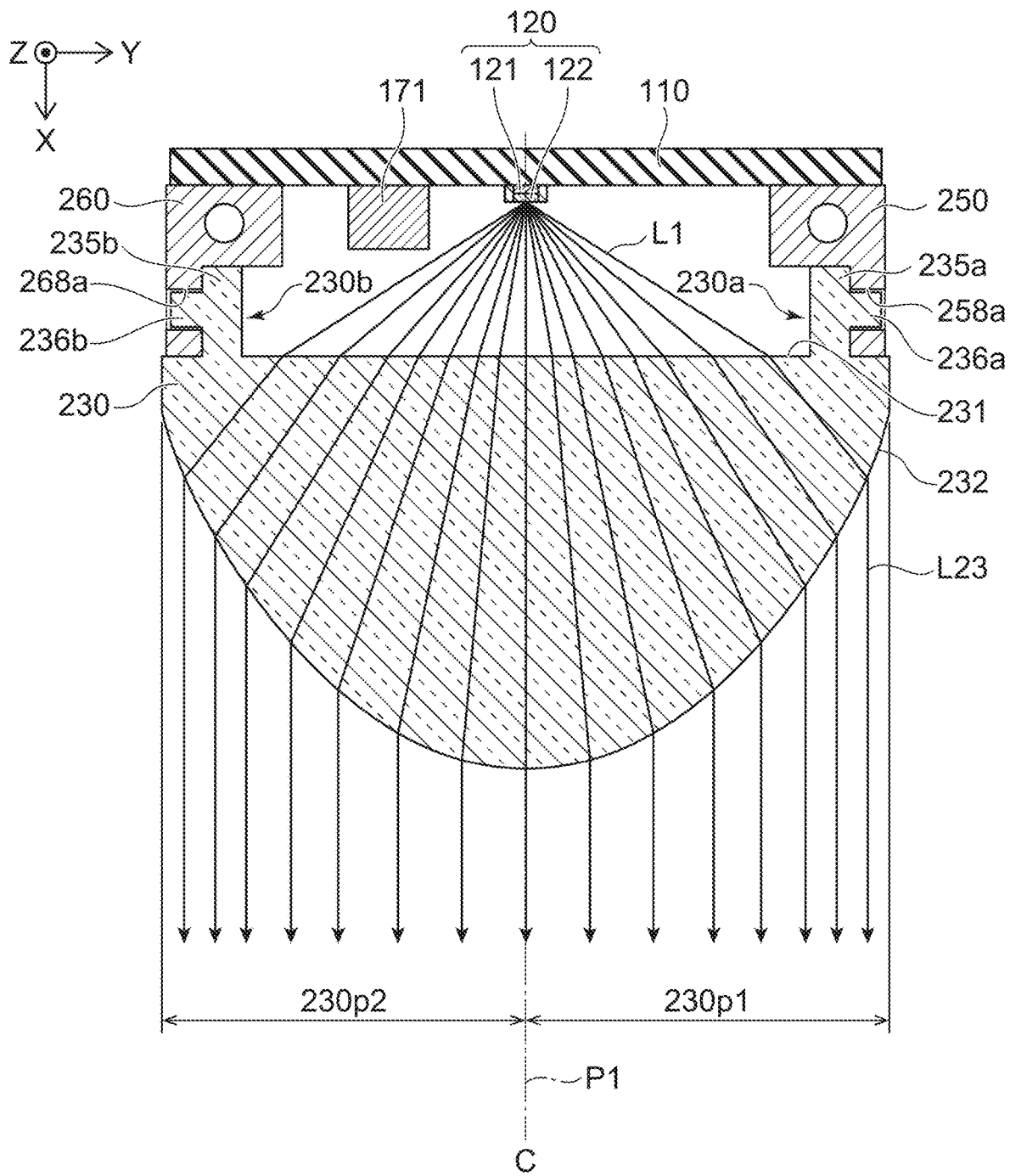
FIG. 13 is a cross-sectional view of a lighting module according to a second embodiment showing a cross section including an optical axis of a light source and parallel to the X-Y plane.

FIG. 13 is a cross-sectional view showing a cross section including an optical axis of a light source of a lighting module according to the present embodiment and parallel to the X-Y plane.

Figure 14:
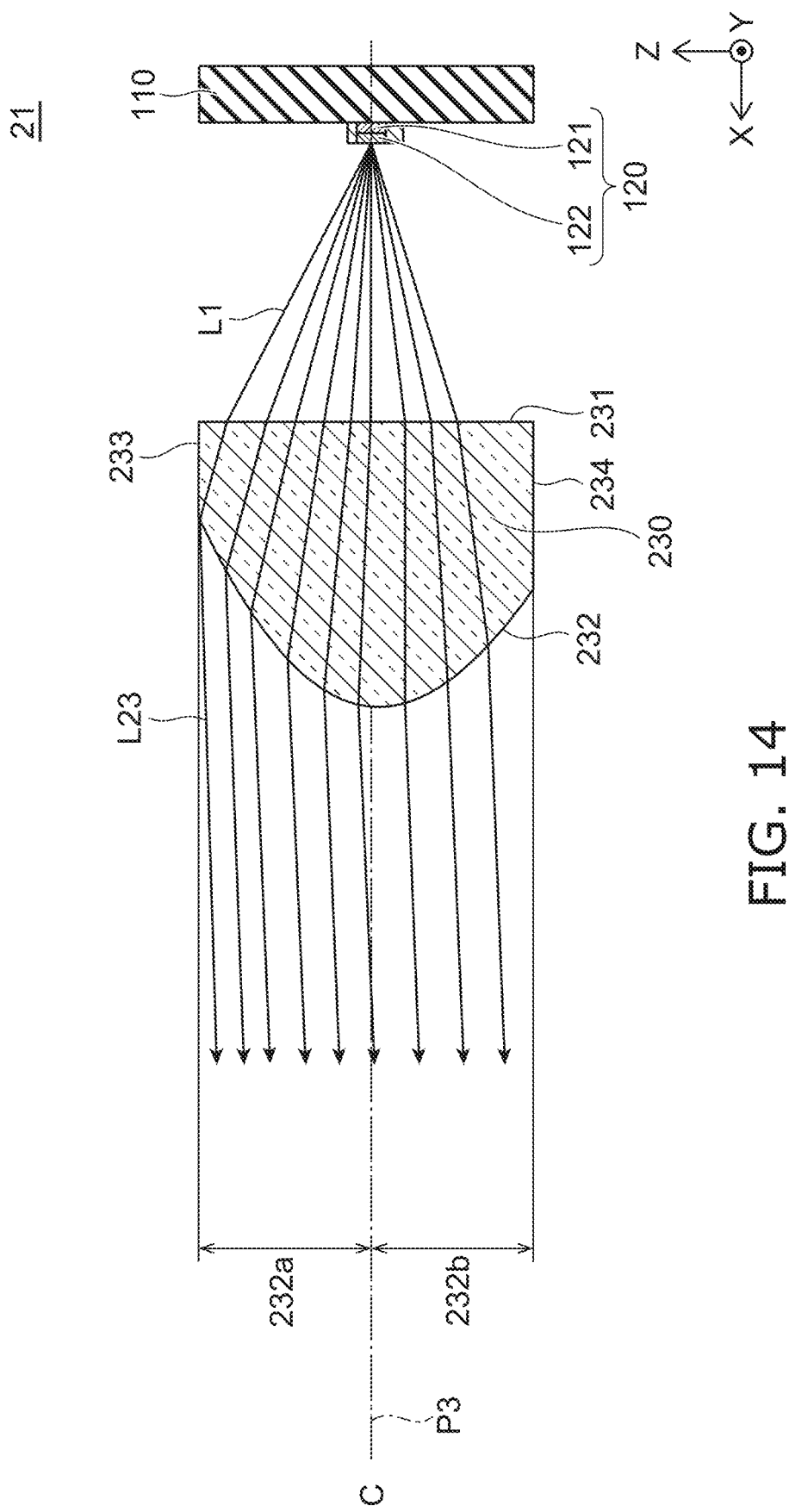
FIG. 14 is a cross-sectional view of the lighting module according to the second embodiment showing a cross section including an optical axis of a light source and parallel to the X-Z plane.

FIG. 14 is a cross-sectional view showing a cross section including an optical axis of the light source of the lighting module according to the present embodiment and parallel to the X-Z plane.

The lighting module 21 according to the present embodiment differs from the lighting module 11 according to the first embodiment in that a first lens 230 is included instead of the first and second lenses 130 and 140.

In the following description, only differences with the first embodiment are mainly described. Other than the items described below, the configuration can be similar to that of the first embodiment. This is similar for the other embodiments described below as well.

As shown in FIG. 13, the first lens 230 is located on the optical axis C of the light source 120 at the +X side of the light source 120. The light L1 that is emitted from the light source 120 is incident on the first lens 230.

When the first lens 130 is divided into a first part 230p1 and a second part 230p2 by the plane P1 as a boundary, the first part 230p1 and the second part 230p2 have shapes that are substantially symmetric with respect to the plane P1. Specifically, as shown in FIG. 14, the surface of the first lens 230 includes a first light incident surface 231 on which the light L1 emitted from the light source 120 is incident, a first light-emitting surface 232 positioned at the +X side, which is the side opposite to the first light incident surface 231, a first surface 233 positioned between the +Z direction edge of the first light incident surface 231 and the +Z direction edge of the first light-emitting surface 232, and a second surface 234 positioned between the −Z direction edge of the first light incident surface 231 and the −Z direction edge of the first light-emitting surface 232.

The first light incident surface 231 is flat and substantially parallel to the Y-Z plane. As shown in FIG. 13, the first light-emitting surface 232 is curved to be convex in the +X direction when viewed from the +Z direction. The apex of the first light-emitting surface 232 is positioned substantially on the optical axis C when viewed from the +Z direction. Also, as shown in FIG. 14, the first light-emitting surface 232 is curved to be convex in the +X direction when viewed from the +Y direction. When the first light-emitting surface 232 is divided into a first region 232a and a second region 232b by, as a boundary, a plane P3 that passes through the +Z direction center of the first light-emitting surface 232 and is orthogonal to the +Z direction, the first region 232a and the second region 232b have shapes that are asymmetric with respect to the plane P3. Specifically, the second region 232b is positioned at the −Z side of the first region 232a. Also, the curvature of the second region 232b is less than the curvature of the first region 232a. The +Z direction edge of the first light incident surface 231 and the +Z direction edge of the first light-emitting surface 232 each extend in the Y-direction. Similarly, the −Z direction edge of the first light incident surface 231 and the −Z direction edge of the first light-emitting surface 232 each extend in the Y-direction. The first surface 233 and the second surface 234 each are flat and substantially parallel to the X-Y plane.

As shown in FIG. 13, a first end part 230a of the first lens 230 in the +Y direction includes a protrusion 235a extending from the first light incident surface 231 in the −X direction, and a projection 236a protruding from the protrusion 235a in the +Y direction. Similarly, a second end part 230b of the first lens 230 in the −Y direction includes a protrusion 235b extending from the first light incident surface 231 in the −X direction, and a projection 236b protruding from the protrusion 235b in the −Y direction.

Light L23 that is emitted by the first lens 230 is substantially parallel light that is substantially parallel to the optical axis C when viewed from the +Z direction. As shown in FIG. 14, the light L23 that is emitted by the first lens 230 is substantially parallel light oblique to the optical axis C when viewed from the +Y direction.

As shown in FIG. 13, the substrate 110 and the first end part 230a of the first lens 230 are fixed to a first holder 250. Also, the substrate 110 and the second end part 230b of the first lens 230 are fixed to a second holder 260. Specifically, a through-hole 258a in which the projection 236a can be located is provided in the first holder 250. A through-hole 268a in which the projection 236b can be located is provided in the second holder 260. The through-holes 258a and 268a extend through the holders 250 and 260 in the Y-direction. Similarly to the first embodiment, the substrate 110 is fixed to the first and second holders 250 and 260 by screws, etc.

The first holder 250 does not protrude outward of the first lens 230 in the +Y direction, the +Z direction, or the −Z direction when viewed from the +X direction. Similarly, the second holder 260 does not protrude outward of the first lens 230 in the −Y direction, the +Z direction, or the −Z direction when viewed from the +X direction. Also, the substrate 110 does not protrude outward of the first lens 230 in the +Y direction, the −Y direction, the +Z direction, or the −Z direction when viewed from the +X direction.

As described above, the lens that is included in the lighting module 21 may be one lens. In such a case as well, the light that is emitted from the lighting module 21 can be substantially parallel light that is substantially parallel to the optical axis C when viewed from the +Z direction, and can be substantially parallel light that is oblique to the optical axis C when viewed from the +Y direction.

Third Embodiment

A third embodiment will now be described.

Figure 15:
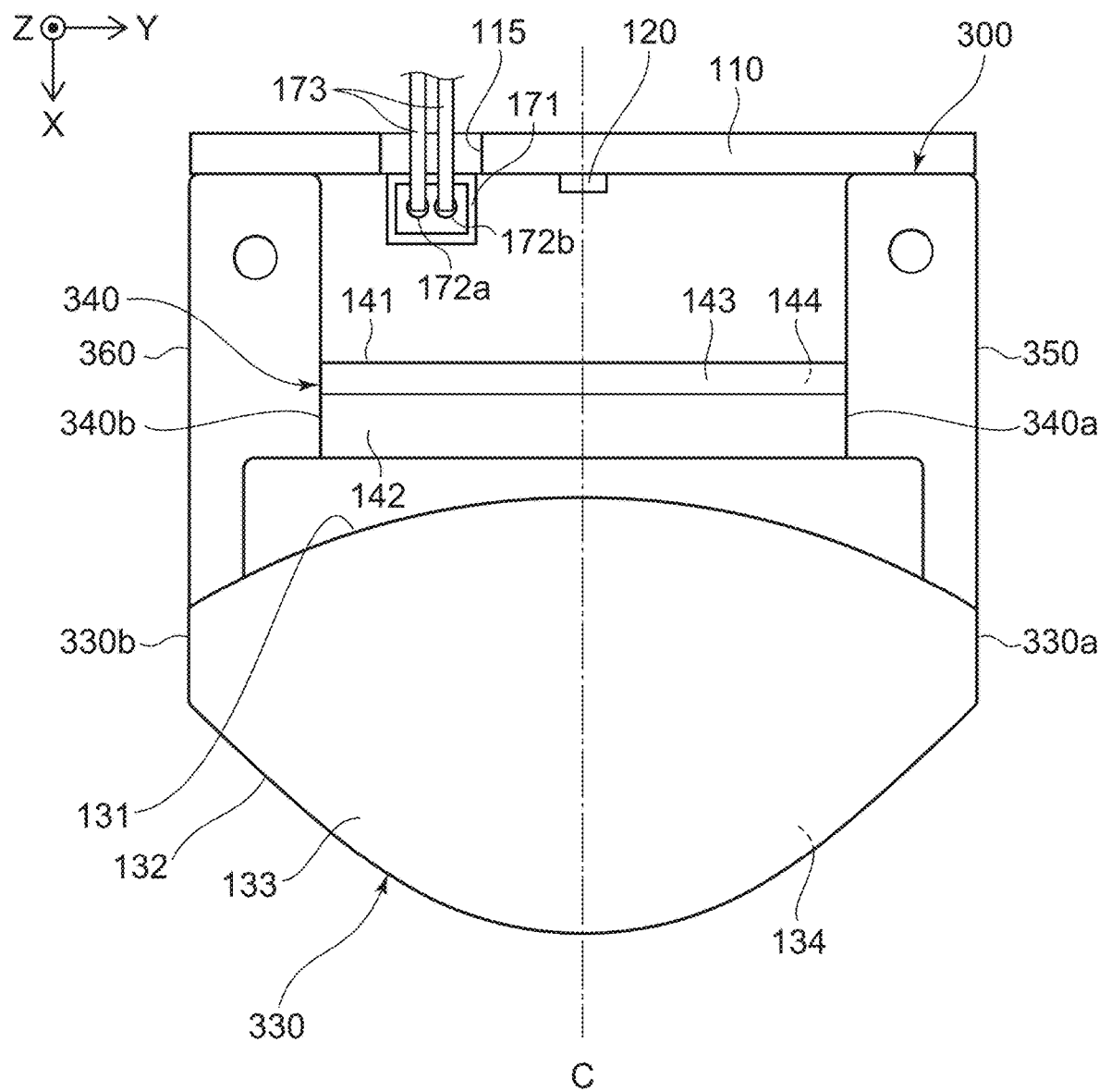
FIG. 15 is a top view showing a lighting module according to a third embodiment.

FIG. 15 is a top view showing a lighting module according to the present embodiment.

The lighting module 31 according to the present embodiment differs from the lighting module 11 according to the first embodiment in that a resin member 300 that includes a first lens part 330, a second lens part 340, a first light-shielding part 350, and a second light-shielding part 360 is included instead of the first lens 130, the second lens 140, the first holder 150, and the second holder 160.

The first lens part 330 is located on the optical axis C of the light source 120. The second lens part 340 is located on the optical axis C between the first lens part 330 and the light source 120. The light that is emitted from the light source 120 is incident on the second lens part 340. The light that is emitted from the light source 120 and travels via the second lens part 340 is incident on the first lens part 330.

Similarly to the first lens 130 according to the first embodiment, the surface of the first lens part 330 includes the first light incident surface 131, the first light-emitting surface 132, the first surface 133, and the second surface 134. Similarly to the second lens 140 according to the first embodiment, the surface of the second lens part 340 includes the second light incident surface 141, the second light-emitting surface 142, the third surface 143, and the fourth surface 144.

Accordingly, the second lens part 340 condenses the light emitted from the light source 120 when viewed from the +Z direction. Also, the light exiting the second lens part 340 propagates in a direction oblique to the optical axis C toward the +X/−Z direction when viewed from the +Y direction. Also, the first lens part 330 condenses the light that has traveled via the second lens part 340 to be substantially parallel light that is substantially parallel to the optical axis C when viewed from the +Z direction. Also, the light that is exiting the first lens part 330 is substantially parallel light oblique to the optical axis C toward the +X/−Z direction when viewed from the +Y direction.

The first light-shielding part 350 and the second light-shielding part 360 each are positioned between the substrate 110 and the first light-emitting surface 132 of the first lens part 330. Specifically, the first light-shielding part 350 extends from the substrate 110 toward a first end part 330*a* of the first lens part 330 in the +Y direction, and is connected to the first end part 330*a*. Also, a third end portion 340*a* of the second lens part 340 in the +Y direction is connected to the first light-shielding part 350. The first light-shielding part 350 does not protrude outward of the first lens part 330 in the +Y direction, the +Z direction, or the −Z direction when viewed from the +X direction.

Similarly, the second light-shielding part 360 extends from the substrate 110 toward a second end part 330*b* of the first lens part 330 in the −Y direction, and is connected to the second end part 330*b*. Also, a fourth end portion 340*b* of the second lens part 340 in the −Y direction is connected to the second light-shielding part 360. The second light-shielding part 360 does not protrude outward of the first lens part 330 in the −Y direction, the +Z direction, or the −Z direction when viewed from the +X direction.

The −X direction end portions of the first and second light-shielding parts 350 and 360 are fixed to the substrate 110 by fixtures such as screws, rivets, etc.

For example, the resin member 300 that includes the first lens part 330, the second lens part 340, the first light-shielding part 350, and the second light-shielding part 360 can be formed by two-color molding. For example, the first lens part 330 and the second lens part 340 can include a light-transmitting resin material; and the first light-shielding part 350 and the second light-shielding part 360 can include, for example, a dark-colored or black resin material.

Even when such a lighting module 11 is arranged as a plurality in the Y-direction, a region between the irradiation regions of adjacent lighting modules 31 can be inhibited from being dark.

INDUSTRIAL APPLICABILITY

For example, the invention can be utilized in a display device, a sterilization device, wall lighting, or an area sensor device.

REFERENCE NUMERAL LIST

1 display device
10 lighting device
11, 21, 31 lighting module
12*a*, 12*b* fixing member
12*c* flat plate part
12*d* projection
12*e* flat plate part
12*f* mounting part
20 display member
110 substrate
111 front surface
112 back surface
113 first through-hole
114 second through-hole
115 recess
120 light source
121 light-emitting element
122 wavelength conversion member
130, 230 first lens
130*a*, 230*a*, 330*a* first end part
130*b*, 230*b*, 330*b* second end part
130*p*1, 230*p*1 first part
130*p*1, 230*p*2 second part
131, 231 first light incident surface
132, 232 first light-emitting surface
133, 233 first surface
134, 234 second surface
135*a*, 135*b*, 235*a*, 235*b* protrusion
136*a*, 136*b*, 236*a*, 236*b* projection
137*a*, 137*b* step portion
137*s*1, 137*s*2, 137*s*3 surface
138*a*, 138*b* side surface
140 second lens
140*a*, 340*a* third end portion
140*b*, 340*b* fourth end portion
140*p*1 third part
140*p*2 fourth part
141 second light incident surface
142 second light-emitting surface 142a first region
142b second region
143 third surface
144 fourth surface
145a, 145b protrusion
146a, 146b projection
150, 250 first holder
151 first holder surface
151s1, 151s2, 151s3, 151s4, 151s5, 151s6 surface
152 second holder surface
153 third holder surface
154 fourth holder surface
155 fifth holder surface
156 step portion
157a projection
157b threaded hole
158a, 158b, 258a through-hole
159 through-hole
160, 260 second holder
166 step portion
167a projection
167b threaded hole
168a, 168b, 268a through-hole
169 through-hole
171 connector
172a, 172b terminal
173 wiring member
300 resin member
330 first lens part
340 second lens part
350 first light-shielding part
360 second light-shielding part
C optical axis
L1, L2, L3, L23 light
P1, P2, P3 plane

The invention claimed is:

1. A lighting module, comprising:
a substrate;
a light source located on the substrate;
a first lens on which light emitted from the light source is to be incident; and
a first holder to which the substrate and the first lens are fixed, wherein
light exiting the first lens is substantially parallel light that is substantially parallel to the optical axis when viewed from a first direction intersecting an optical axis of the light source,
the light exiting the first lens is substantially parallel light oblique to the optical axis when viewed from a second direction intersecting the optical axis and the first direction,
a first end part of the first lens in the second direction is fixed to the first holder, and
when viewed from a third direction in which the optical axis extends, the first holder does not protrude outward of the first lens in the second direction.

2. The lighting module according to claim 1, wherein when viewed from the third direction, the first holder does not protrude outward of the first lens in the first direction nor in a direction opposite to the first direction.

3. The lighting module according to claim 1, further comprising:
a second holder, the substrate and a second end part of the first lens in a direction opposite to the second direction being fixed to the second holder,
the second holder not protruding outward of the first lens in the direction opposite to the second direction when viewed from the third direction.

4. The lighting module according to claim 1, wherein the first holder is configured to shield light.

5. The lighting module according to claim 1, further comprising:
a second lens on which light emitted from the light source is to be incident, the second lens being located between the light source and the first lens, wherein
the second lens is fixed to the first holder, and
light that is emitted from the light source and travels via the second lens is to be incident on the first lens.

6. The lighting module according to claim 5, wherein the second lens is configured to condense the light emitted from the light source when viewed from the second direction, and
the first lens is configured to condense the light traveling via the second lens when viewed from the first direction.

7. The lighting module according to claim 5, wherein the first lens includes:
a first light incident surface on which the light traveling via the second lens is to be incident; and
a first light-emitting surface opposite to the first light incident surface, the first light-emitting surface being curved to be convex when viewed from the first direction, and
the second lens includes:
a second light incident surface on which the light emitted from the light source is to be incident; and
a second light-emitting surface opposite to the second light incident surface, the second light-emitting surface being curved to be convex when viewed from the second direction.

8. The lighting module according to claim 7, wherein an edge of the first light incident surface in the first direction and an edge of the first light-emitting surface in the first direction extend in the second direction,
an edge of the first light incident surface in a direction opposite to the first direction and an edge of the first light-emitting surface in the direction opposite to the first direction extend in the second direction, and
the first lens further includes:
a first surface positioned between the edge of the first light incident surface in the first direction and the edge of the first light-emitting surface in the first direction; and
a second surface positioned between the edge of the first light incident surface in the direction opposite to the first direction and the edge of the first light-emitting surface in the direction opposite to the first direction.

9. The lighting module according to claim 7, wherein when the second light-emitting surface is divided into a first region and a second region by, as a boundary, a plane that passes through a center of the second light-emitting surface in the first direction and is orthogonal to the first direction, the first region and the second region are asymmetric with respect to the plane.

10. The lighting module according to claim 1, wherein the substrate does not protrude outward of the first lens in the second direction nor in a direction opposite to the second direction when viewed from the third direction.

11. The lighting module according to claim 1, wherein a through-hole or a recess is formed in the first holder, and the first lens includes a projection configured to be located inside the through-hole or the recess.

12. A lighting device, comprising:
a plurality of the lighting modules according to claim 1; and
a fixing member configured to fix the plurality of lighting modules,
the fixing member being arranged to face the plurality of lighting modules in the first direction in a state in which the plurality of lighting modules are arranged in the second direction.

* * * * *